US008624493B2

(12) United States Patent
Asmussen et al.

(10) Patent No.: US 8,624,493 B2
(45) Date of Patent: Jan. 7, 2014

(54) INTEGRATED GAS DISCHARGE LAMP WITH AN IGNITION ELECTRONICS INTEGRATED INTO THE BASE FOR GENERATING ASYMMETRICAL IGNITION PULSES

(75) Inventors: Knut Asmussen, München (DE); Bernhard Siessegger, München (DE)

(73) Assignee: OSRAM Gesellschaft mit beschrankter Haftung, Munich (DE)

( * ) Notice: Subject to any disclaimer, the term of this patent is extended or adjusted under 35 U.S.C. 154(b) by 231 days.

(21) Appl. No.: 13/132,075

(22) PCT Filed: Nov. 18, 2009

(86) PCT No.: PCT/EP2009/065400
§ 371 (c)(1),
(2), (4) Date: May 31, 2011

(87) PCT Pub. No.: WO2010/060842
PCT Pub. Date: Jun. 3, 2010

(65) Prior Publication Data
US 2011/0234096 A1 Sep. 29, 2011

(30) Foreign Application Priority Data

Nov. 28, 2008 (DE) .......................... 10 2008 059 484
Nov. 28, 2008 (DE) .......................... 10 2008 059 561

(51) Int. Cl.
*H01J 5/16* (2006.01)
*H01J 61/56* (2006.01)

(52) U.S. Cl.
USPC ............. 313/635; 313/637; 313/573; 315/53; 315/51

(58) Field of Classification Search
USPC ........... 313/318.01, 493, 489, 568, 573, 635, 313/637; 315/51, 291, 307, 308, 312–315, 315/53
See application file for complete search history.

(56) References Cited

U.S. PATENT DOCUMENTS

| 5,036,256 | A | 7/1991 | Garrison et al. |
| 7,973,479 | B2 * | 7/2011 | Tsuda et al. .................. 313/634 |
| 8,049,422 | B2 * | 11/2011 | Tsuda et al. .................. 313/568 |
| 2003/0222605 | A1 * | 12/2003 | Okamoto et al. ............. 315/308 |
| 2006/0279229 | A1 | 12/2006 | Okawa |
| 2008/0143276 | A1 | 6/2008 | Hsueh et al. |
| 2009/0134792 | A1 * | 5/2009 | Tsuda et al. .................. 313/568 |
| 2009/0146546 | A1 * | 6/2009 | Tsuda et al. .................. 313/493 |
| 2010/0134010 | A1 * | 6/2010 | Asmussen et al. ............. 315/51 |
| 2010/0187995 | A1 * | 7/2010 | Takagaki et al. .............. 313/638 |
| 2010/0270923 | A1 * | 10/2010 | Froehlich et al. .............. 315/32 |
| 2010/0289429 | A1 * | 11/2010 | Pollmann-Retsch et al. . 315/307 |

FOREIGN PATENT DOCUMENTS

DE 19803139 A1 7/1999

* cited by examiner

*Primary Examiner* — Vibol Tan
(74) *Attorney, Agent, or Firm* — Cozen O'Connor

(57) ABSTRACT

An integrated gas discharge lamp (5) with ignition electronics integrated into the base, comprising an ignition transformer ($T_{IP}$), an ignition capacitor (CIP), and a controlled switching element (SIP), wherein the integrated ignition electronics are configured to generate an asymmetrical ignition pulse, and wherein the voltage ratio between the first lamp electrode near the base and the second lamp electrode distant from the base ranges from 22:1 to 5:4.

14 Claims, 27 Drawing Sheets

Figure 1:
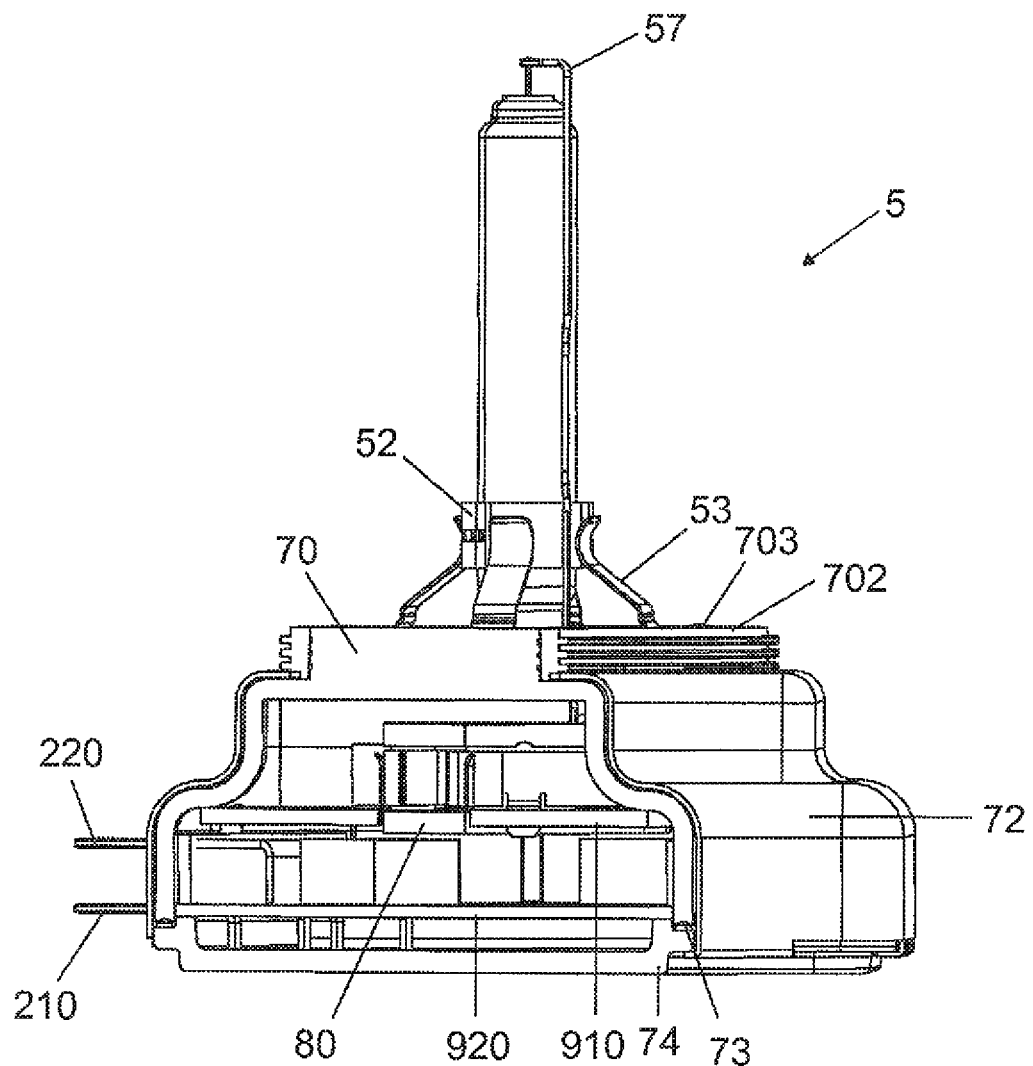

INTEGRATED GAS DISCHARGE LAMP WITH AN IGNITION ELECTRONICS INTEGRATED INTO THE BASE FOR GENERATING ASYMMETRICAL IGNITION PULSES

RELATED APPLICATIONS

This is a U.S. national stage of application No. PCT/EP2009/065400, filed on Nov. 18, 2009.

This application claims the priority of German application no. 10 2008 059 561.6 filed Nov. 28, 2008 and 10 2008 059 484.9 filed Nov. 28, 2008, the entire content of both of which are hereby incorporated by reference.

FIELD OF THE INVENTION

The invention relates to an integrated gas discharge lamp, with ignition electronics integrated the base, said ignition electronics comprising an ignition transformer, an ignition capacitor, and a controlled switching element.

BACKGROUND OF THE INVENTION

U.S. Pat. No. 5,036,256 discloses a switching arrangement with symmetrical pulse ignition comprising an ignition transformer 20 and a controlled switching element SG. The secondary winding of the ignition transformer is split, and each half of the secondary winding acts on a respective electrode of the gas discharge lamp. Although symmetrical pulse ignition is very effective, it has the disadvantage that the gas discharge lamp burner must then likewise be symmetrically ended so as to avoid flashovers when the lamp is ignited.

DE 198 03 189 A1 discloses a gas discharge lamp with an integrated ignition device which implements asymmetrical pulse ignition. The ignition transformer has a secondary winding which acts on an electrode of the gas discharge lamp. This ignition arrangement is very frequently used for single ended gas discharge lamps, as the entire ignition voltage is applied to one electrode, and only very little voltage is present at the other electrode at the moment of ignition. This electrode is the electrode distant from the base and is connected to the ignition or operating electronics via a so-called return conductor. The disadvantage of this topology is that the entire ignition voltage is present at the electrode near the base, also commonly termed the 'hot' electrode, resulting in higher losses due to capacitive effects and corona discharges.

SUMMARY OF THE INVENTION

One object of the invention is to provide an integrated gas discharge lamp having ignition electronics integrated in the base which comprise an ignition transformer, an ignition capacitor and a controlled switching element, said ignition electronics avoiding the abovementioned disadvantages.

This object is achieved according to one aspect of the invention directed to an integrated gas discharge lamp with ignition electronics integrated in the base, comprising an ignition transformer, an ignition capacitor and a controlled switching element, wherein the integrated ignition electronics is designed to generate an asymmetrical ignition pulse, and the voltage ratio between the first lamp electrode near the base and the second lamp electrode distant from the base ranges from 22:1 to 5:4.

The duration of the first half cycle of the asymmetrical ignition pulse preferably ranges between 10 ns and 100 µs, in particular between 40 ns and 1 µs. The voltage that can be generated by said asymmetrical ignition pulse at the first lamp electrode near the base is 4-25 kV, the voltage that can be generated by the asymmetrical ignition pulse at the second lamp electrode distant from the base is 0.5-8 kV, thereby ensuring safe and reliable ignition of the gas discharge lamp burner.

The ignition transformer preferably has a split secondary winding, a first part being assigned to the first lamp electrode, a second part being assigned to the second lamp electrode and the turns ratio $nS1:nS2$ being expressed by the following equation: $nS2 = 0.04 \ldots 0.8 * nS1$. This ensures a balanced relationship between the voltage at the first lamp electrode near the base and the second lamp electrode distant from the base. The ignition transformer preferably has 1-4 primary turns and 40-380 secondary turns. These numbers of turns enable a gas discharge lamp burner to be ignited in a safe and reliable manner.

In a preferred embodiment, the ignition electronics have a threshold switch with a switching voltage of between 350 and 1300 V. The ignition electronics in the preferred embodiment also have two inductors which are connected in each case between a lamp electrode and a high-voltage-side secondary terminal of the ignition transformer, and a burner capacitor which is connected between the two lamp electrodes, said burner capacitor having a capacitance of less than 22 pF, preferably a capacitance of between 3 and 15 pF. These measures ensure that high-frequency interference produced in the event of breakdown of the discharge arc of the gas discharge lamp burner of the integrated gas discharge lamp is damped as far as possible at its point of origin and thus no longer constitutes a risk to the upstream electronics.

If the ignition electronics have a return capacitor which is connected between the low-voltage-side secondary terminals of the ignition transformer and has a capacitance of 68 pF to 22 nF, any interference reaching the input of the ignition circuit is filtered. In a preferred embodiment, the ignition electronics can have a return conductor choke which together with the return capacitor forms a low pass filter. This increases the filtering effect still further, and filters out high frequency interference coming from the gas discharge lamp burner.

If the ignition electronics has a current-compensated choke connected to the input of the ignition electronics, the electromagnetic compatibility of the circuit arrangement is further improved. In order to filter out voltage peaks, the ignition electronics preferably have a TVS diode which is connected between the input terminals of the ignition electronics.

In order to ensure that the return conductor cannot be touched when a voltage is applied thereto, the gas discharge lamp preferably has a base which, when inserted in a reflector, simultaneously accomplishes mechanical fixing and at the same time establishes electrical contact.

BRIEF DESCRIPTION OF DRAWING(S)

Figure 2:
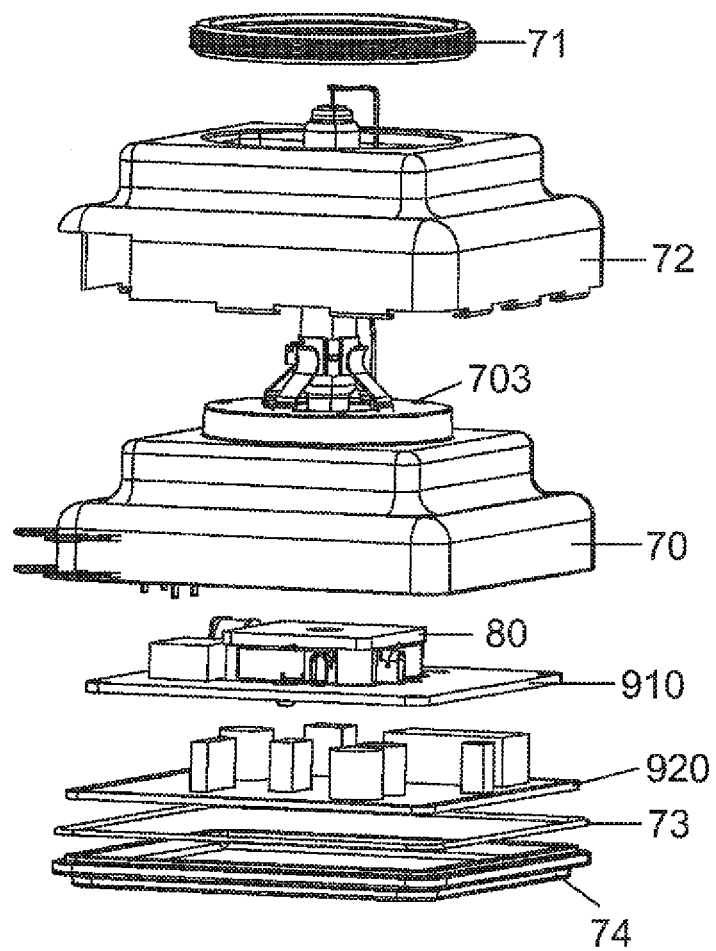
Figure 3:
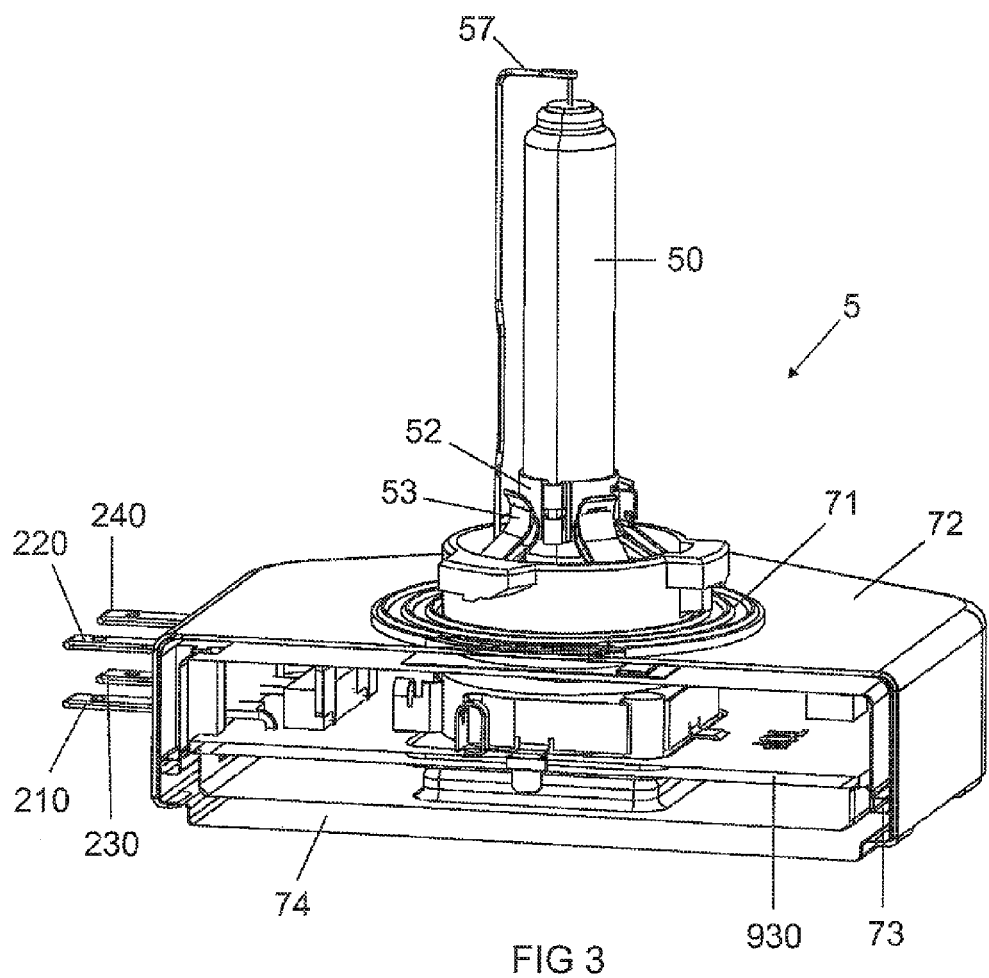
Figure 4:
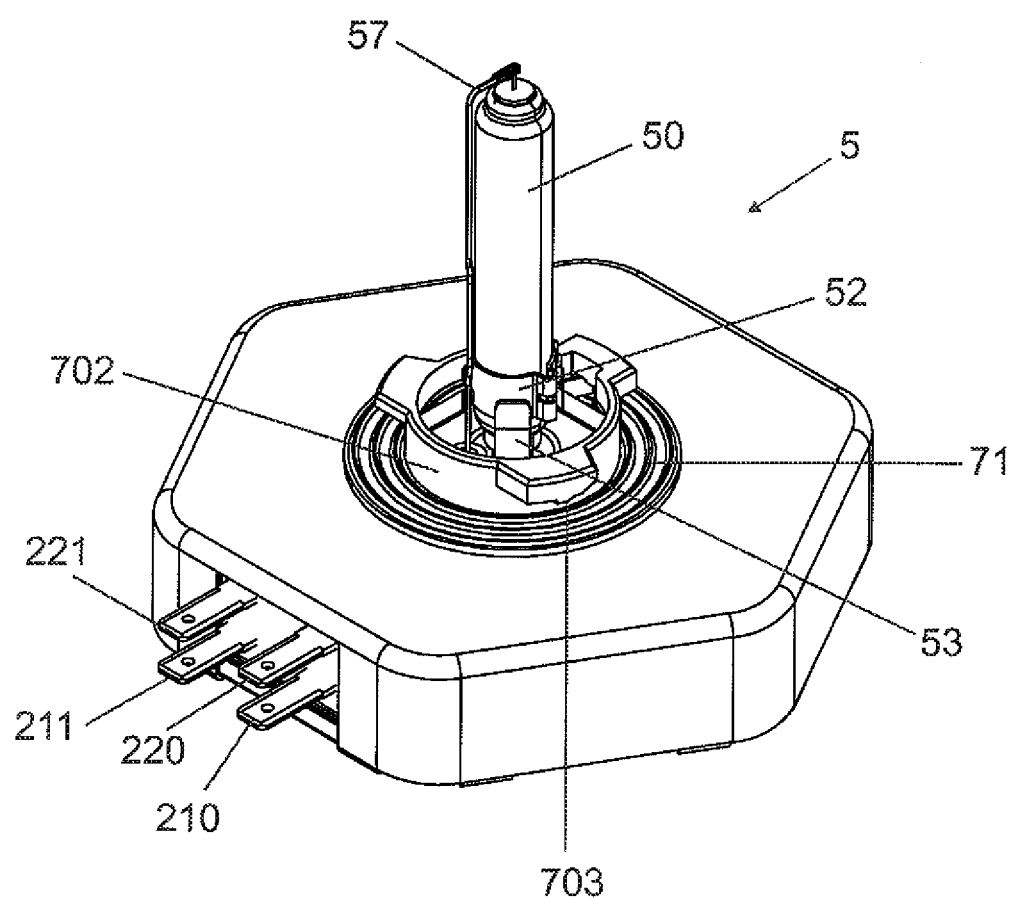
Figure 5:
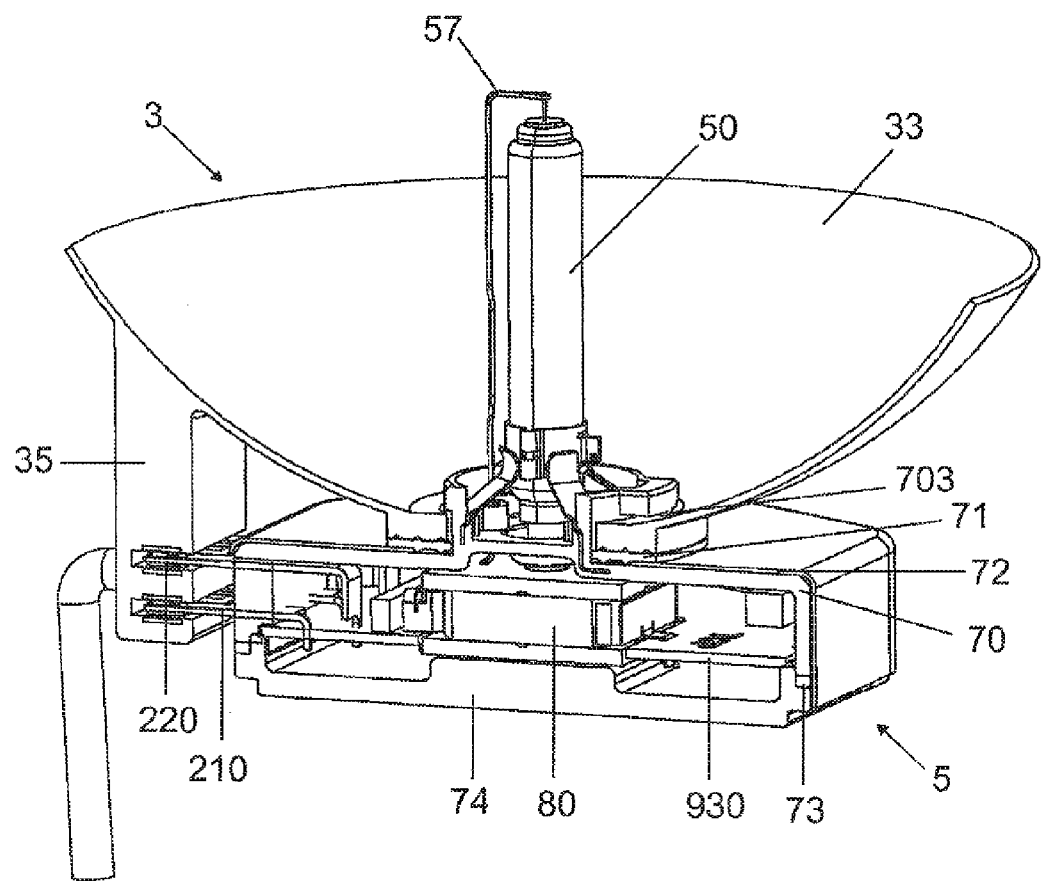
Figure 6:
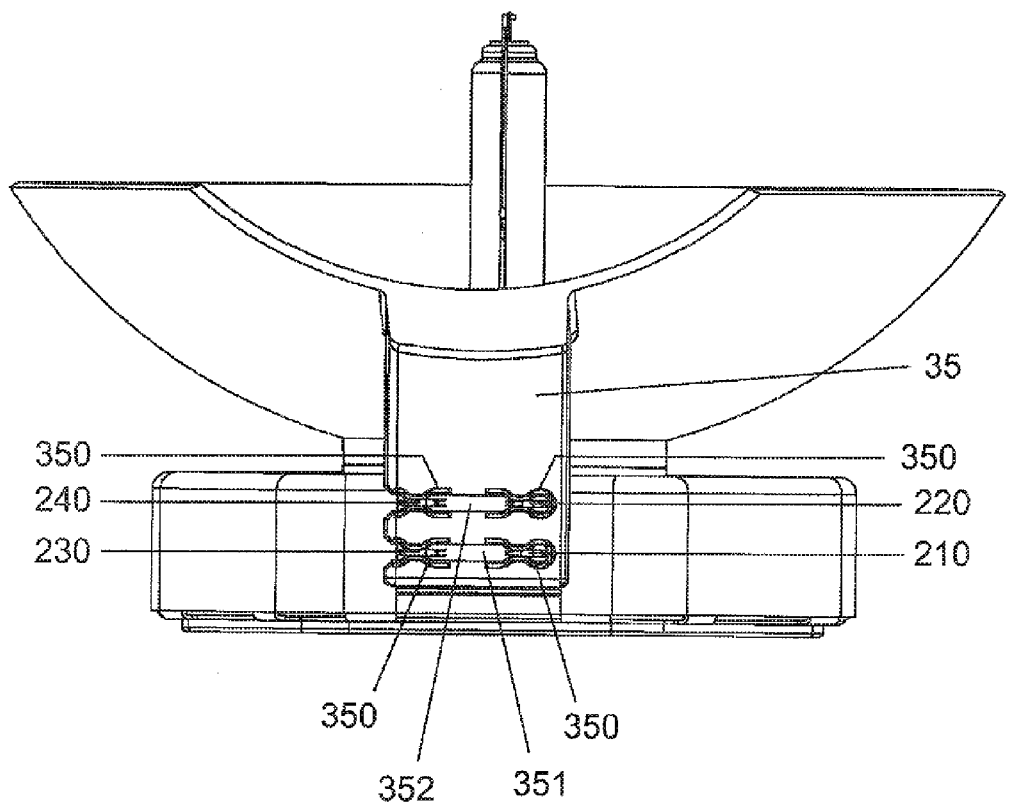
Figure 7:
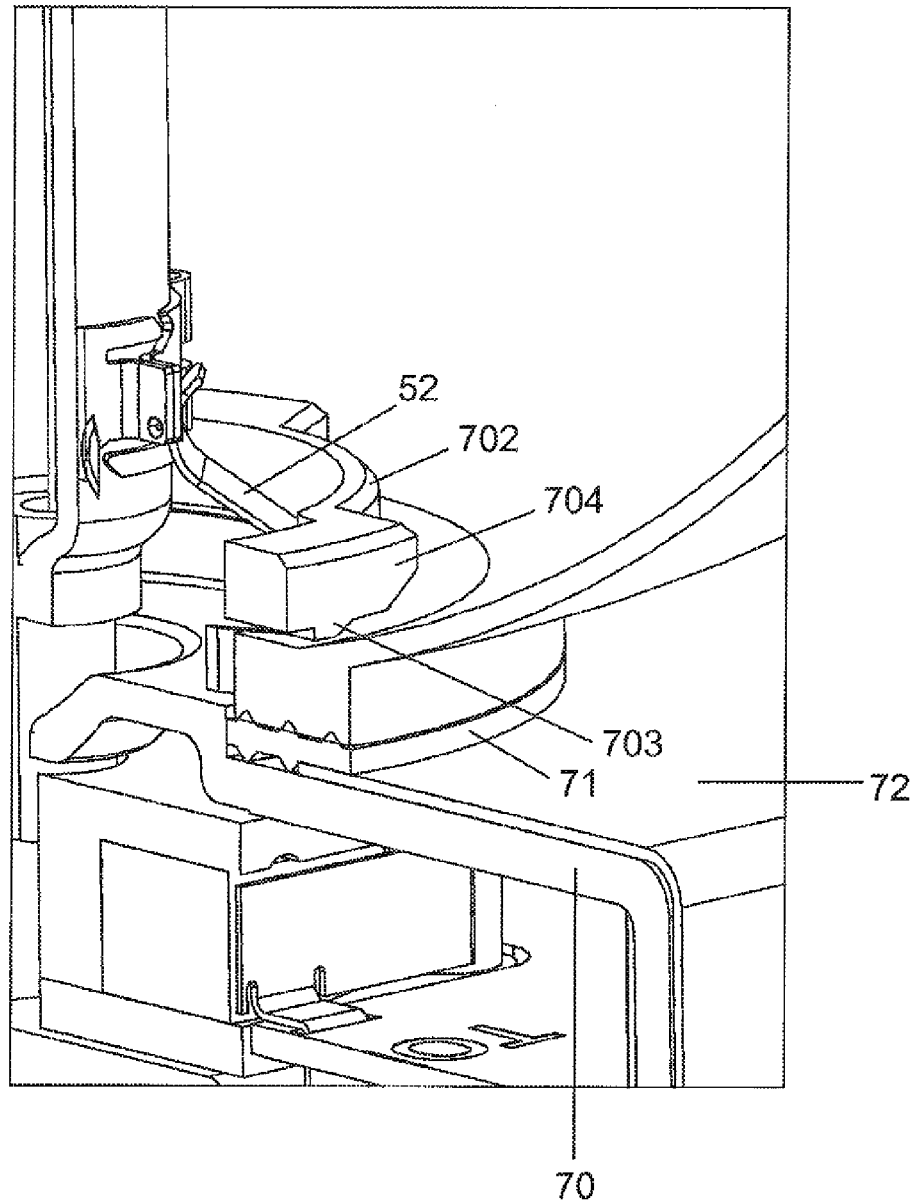
Figure 8:
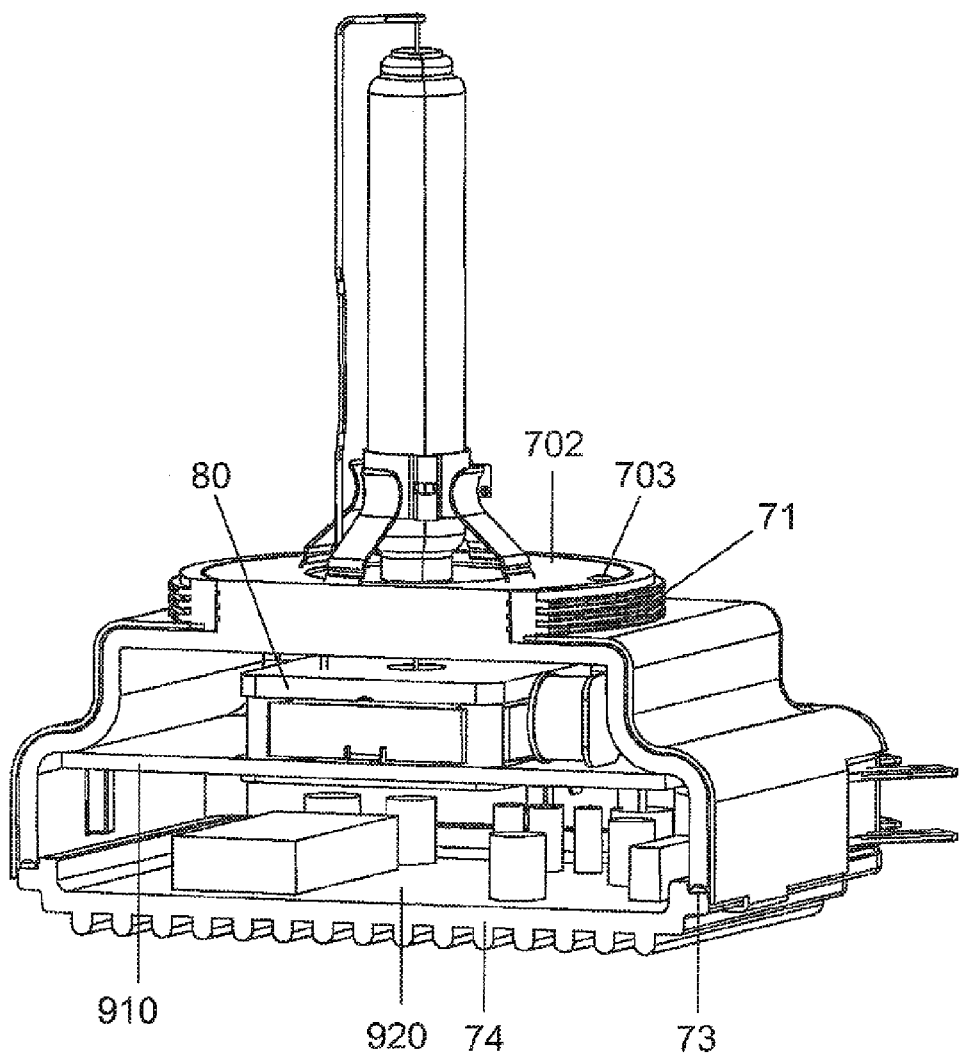
Figure 9:
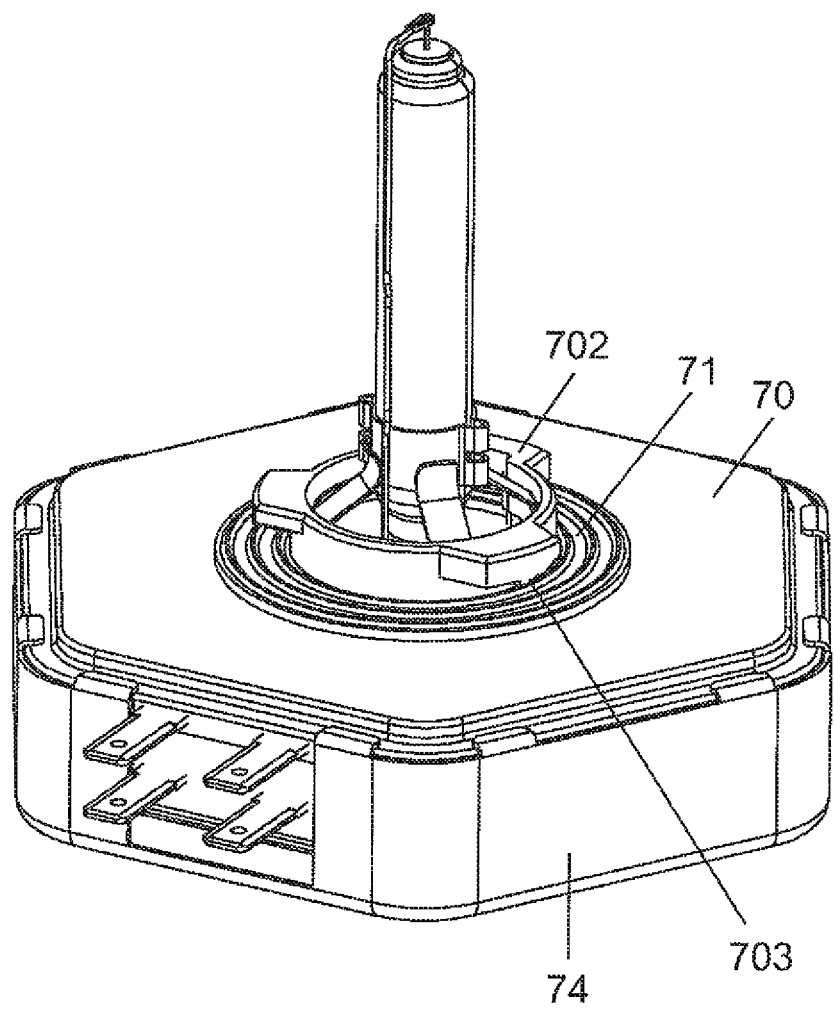
Figure 10:
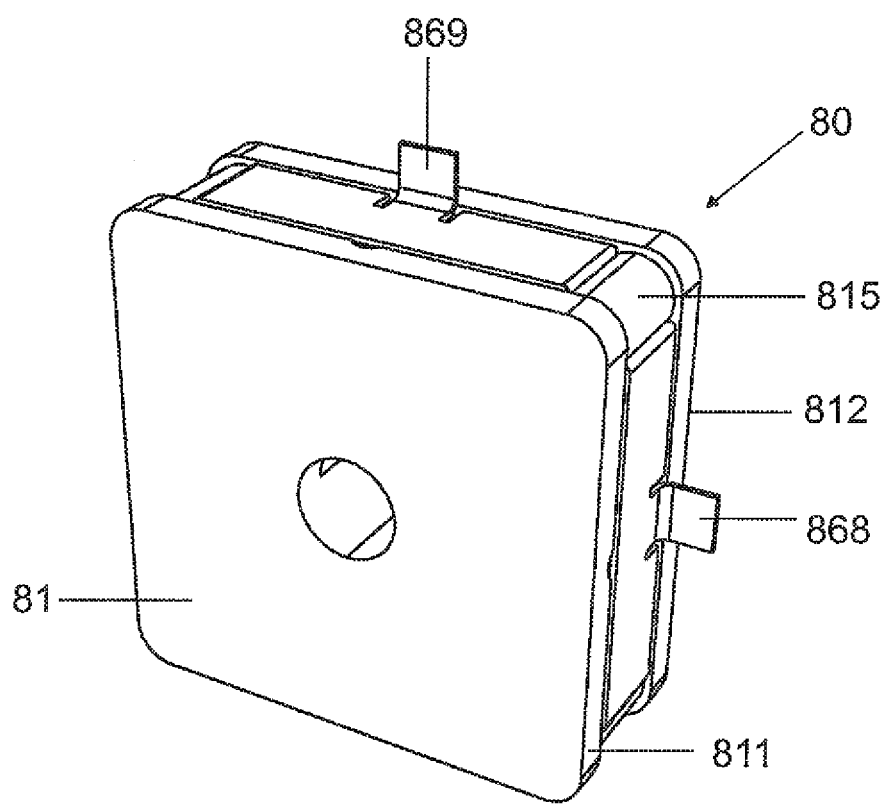
Figure 11:
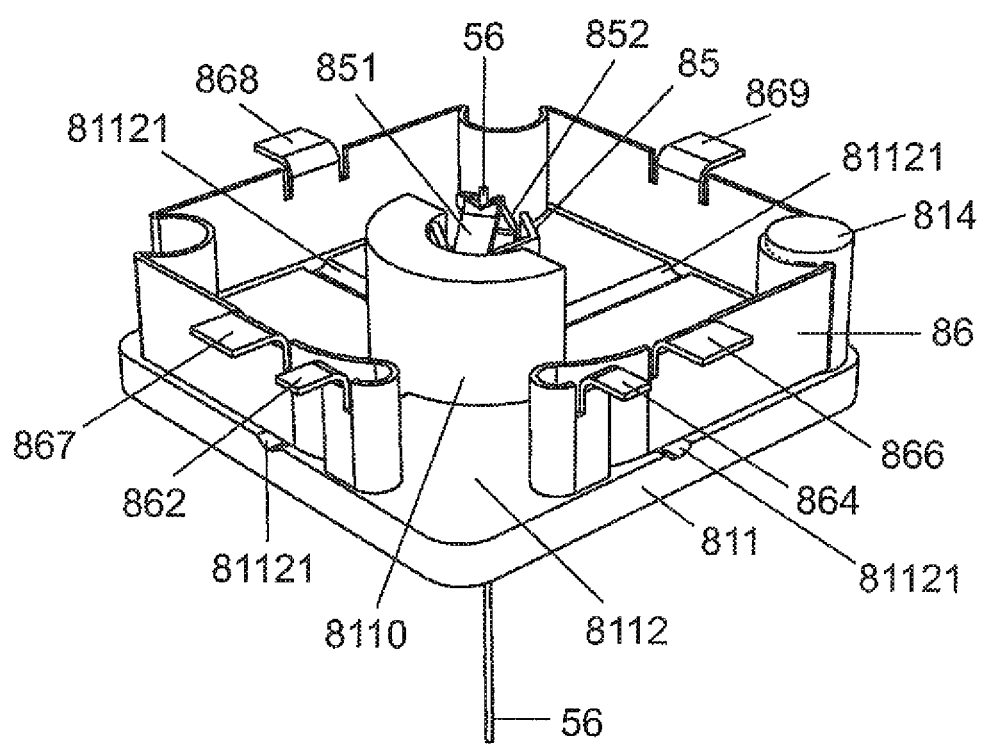
Figure 12:
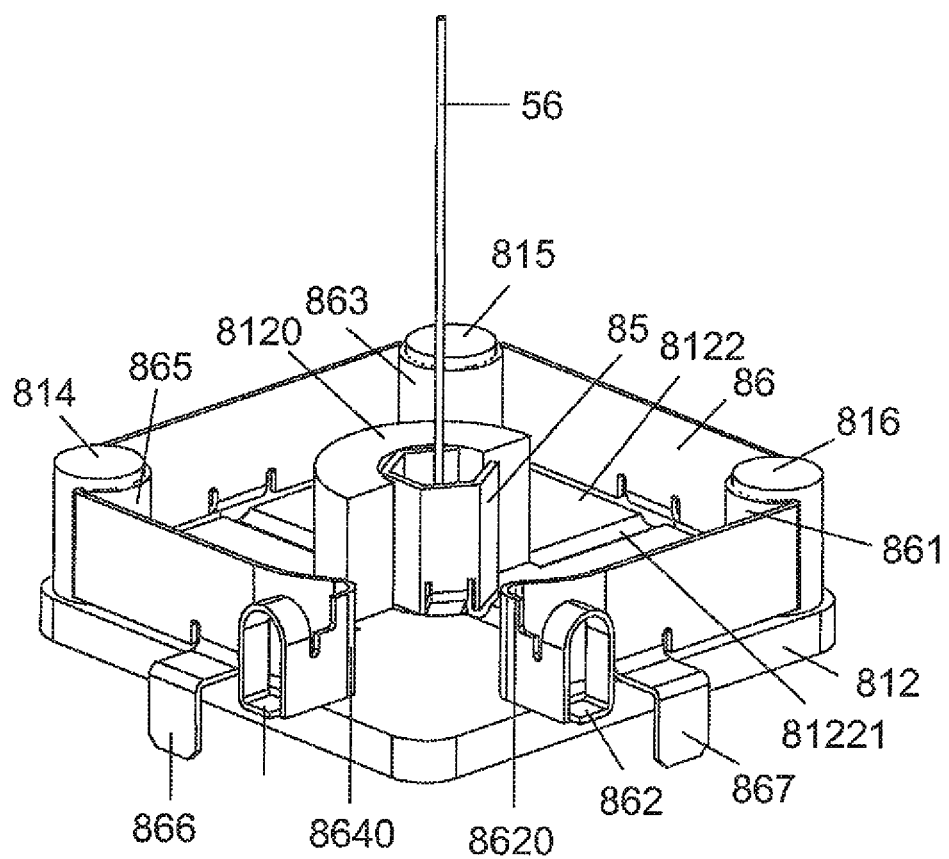
Figure 13:
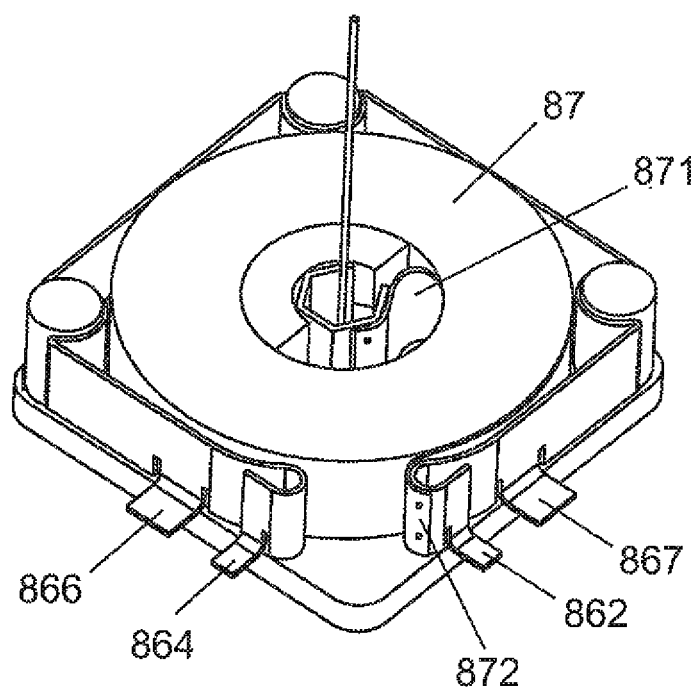
Figure 14:
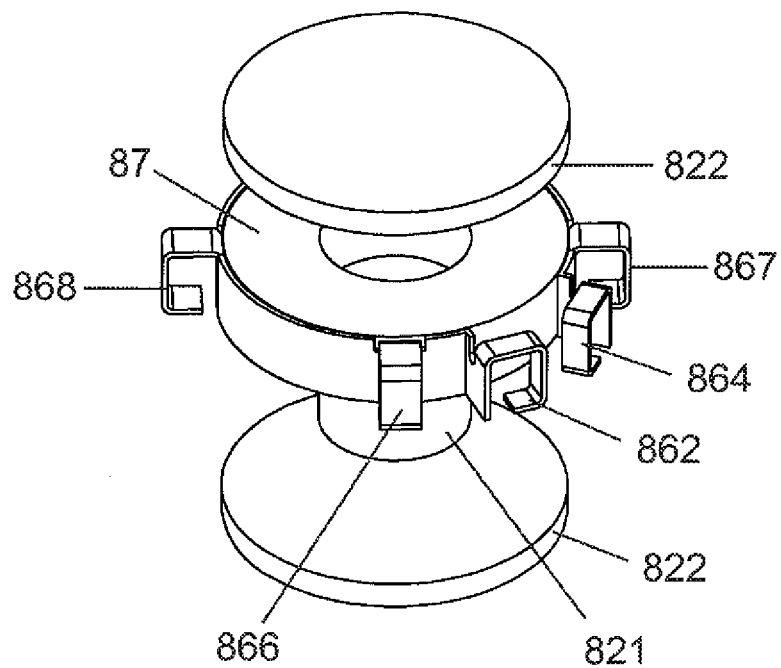
Figure 15:
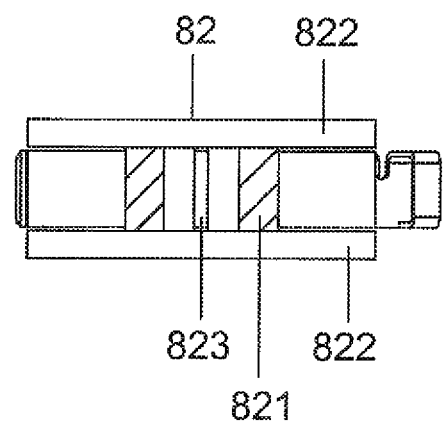
Figure 16:
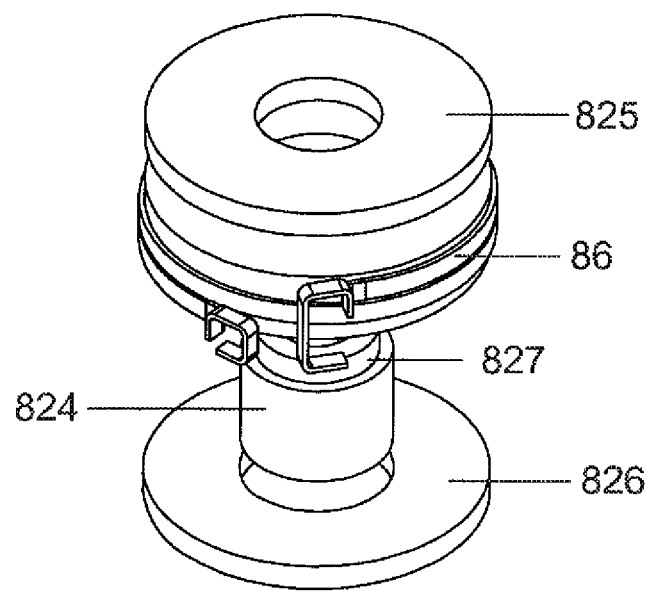
Figure 17:
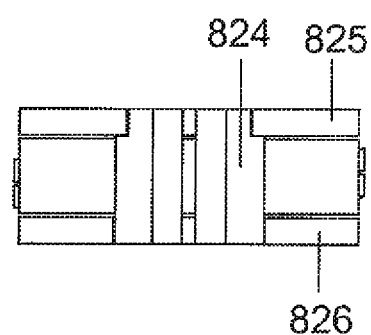
Figure 18A:
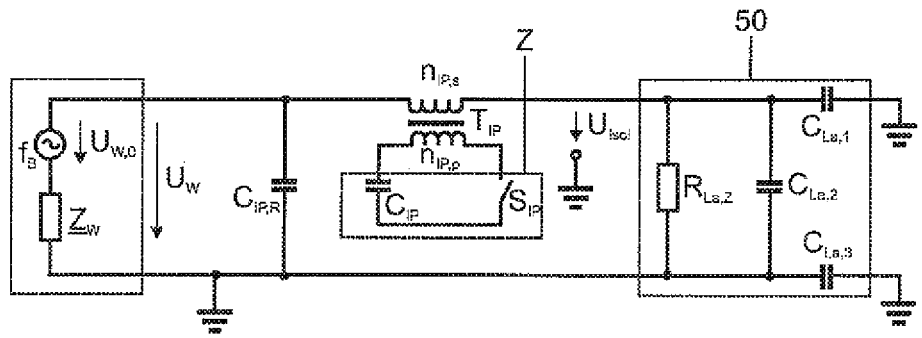
Figure 18B:
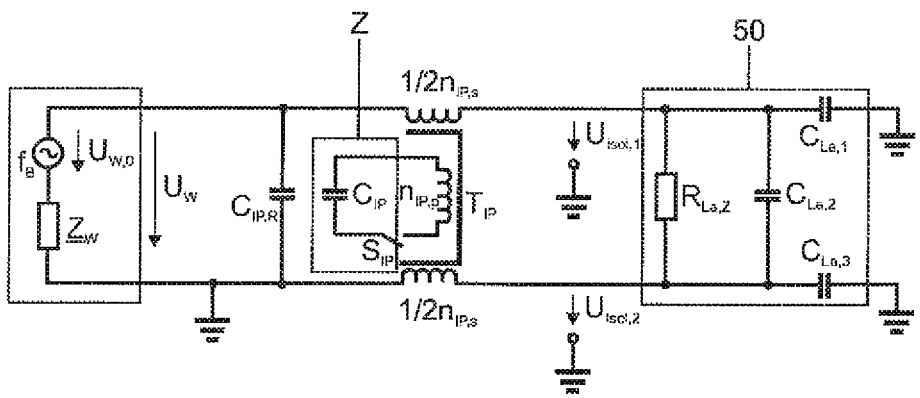
Figure 19:
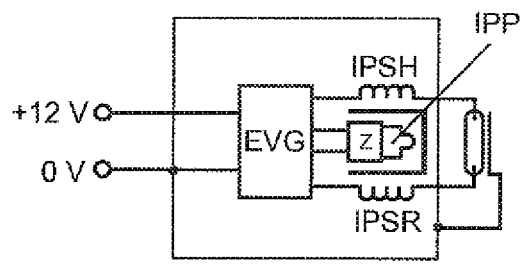
Figure 20:
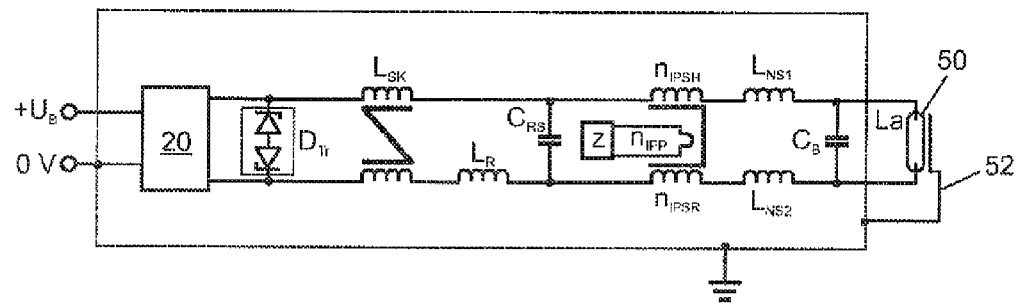
Figure 21:
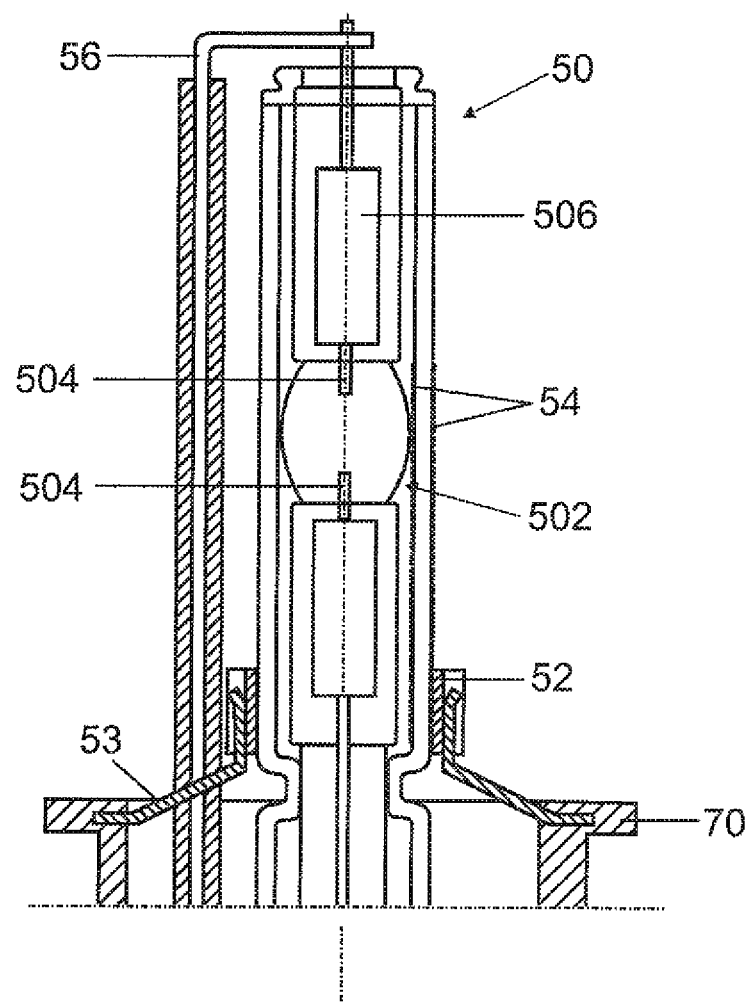
Figure 22:
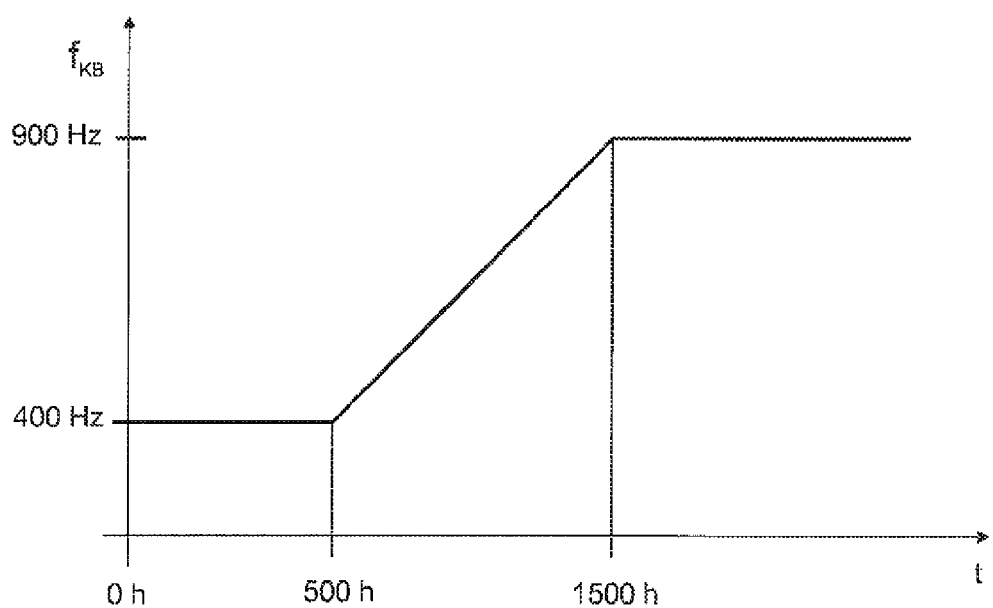
Figure 23:
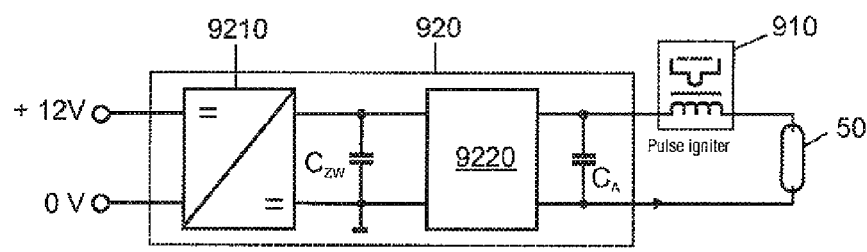
Figure 24:
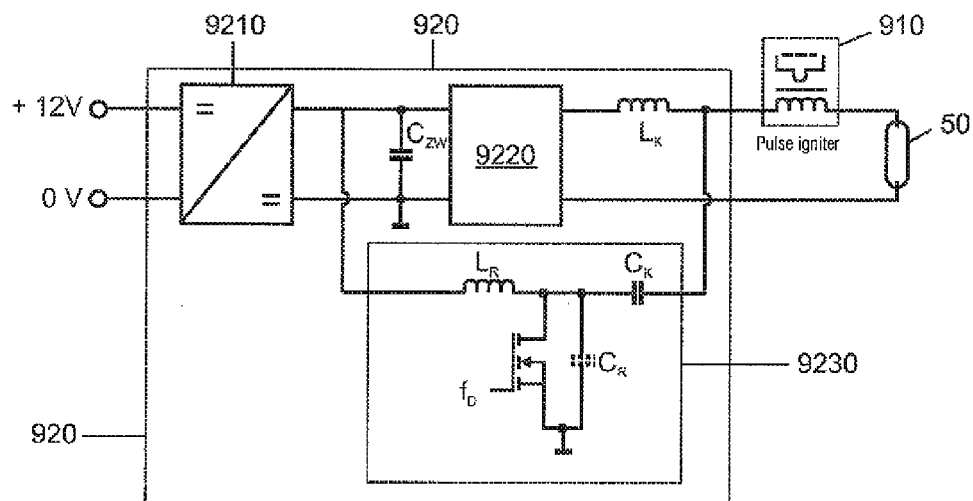
Figure 25:
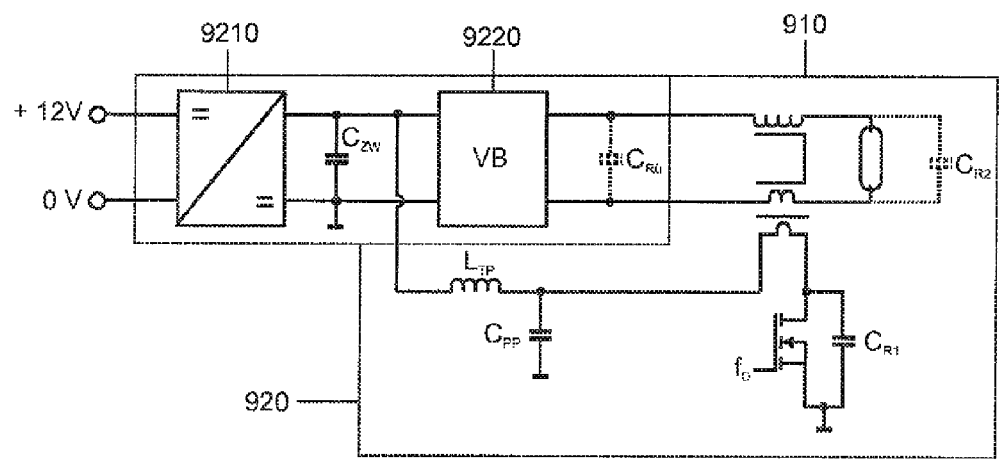
Figure 26:
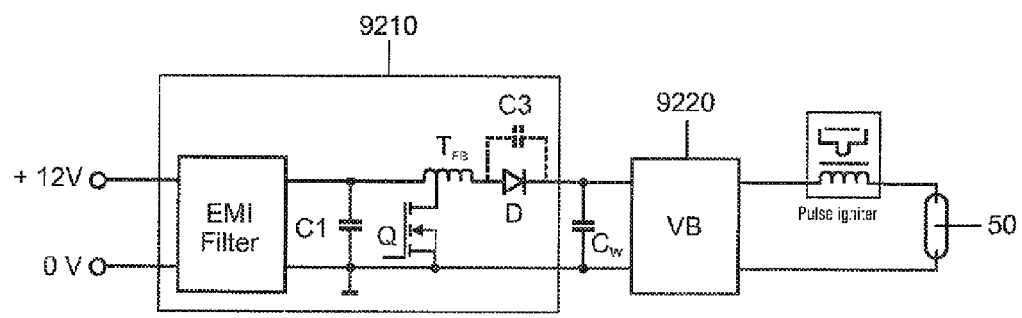
Figure 27:
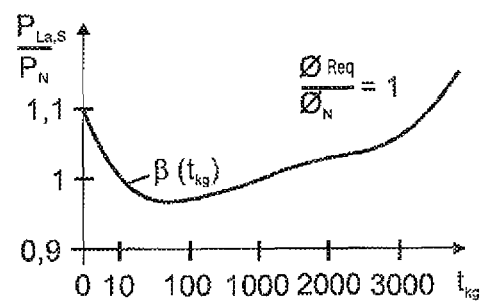
Figure 28:
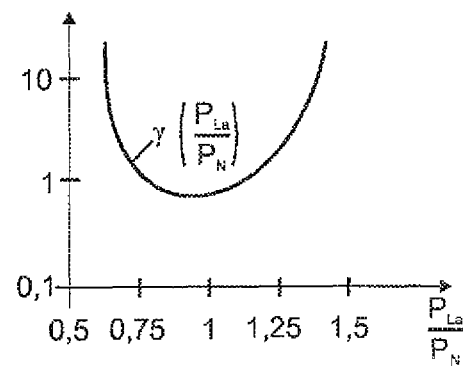
Figure 29:
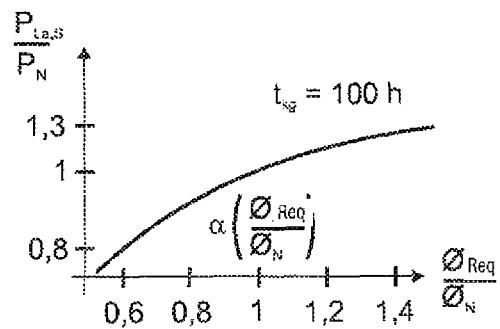
Figure 30:
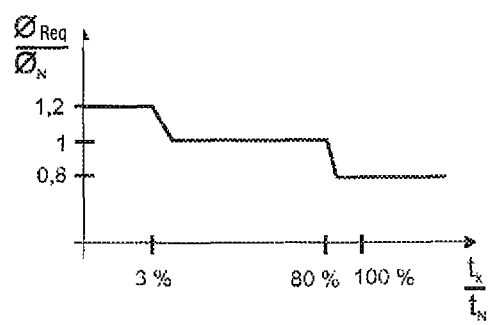
Figure 31:
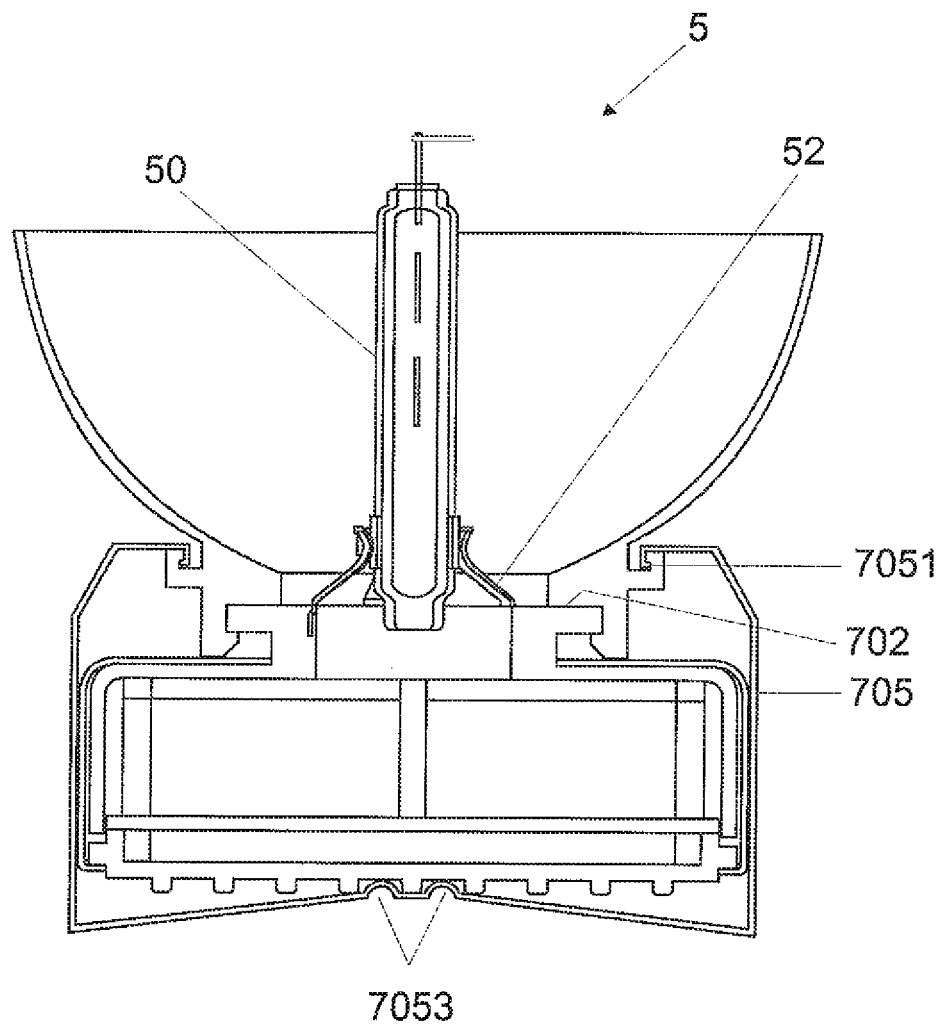
Figure 32:
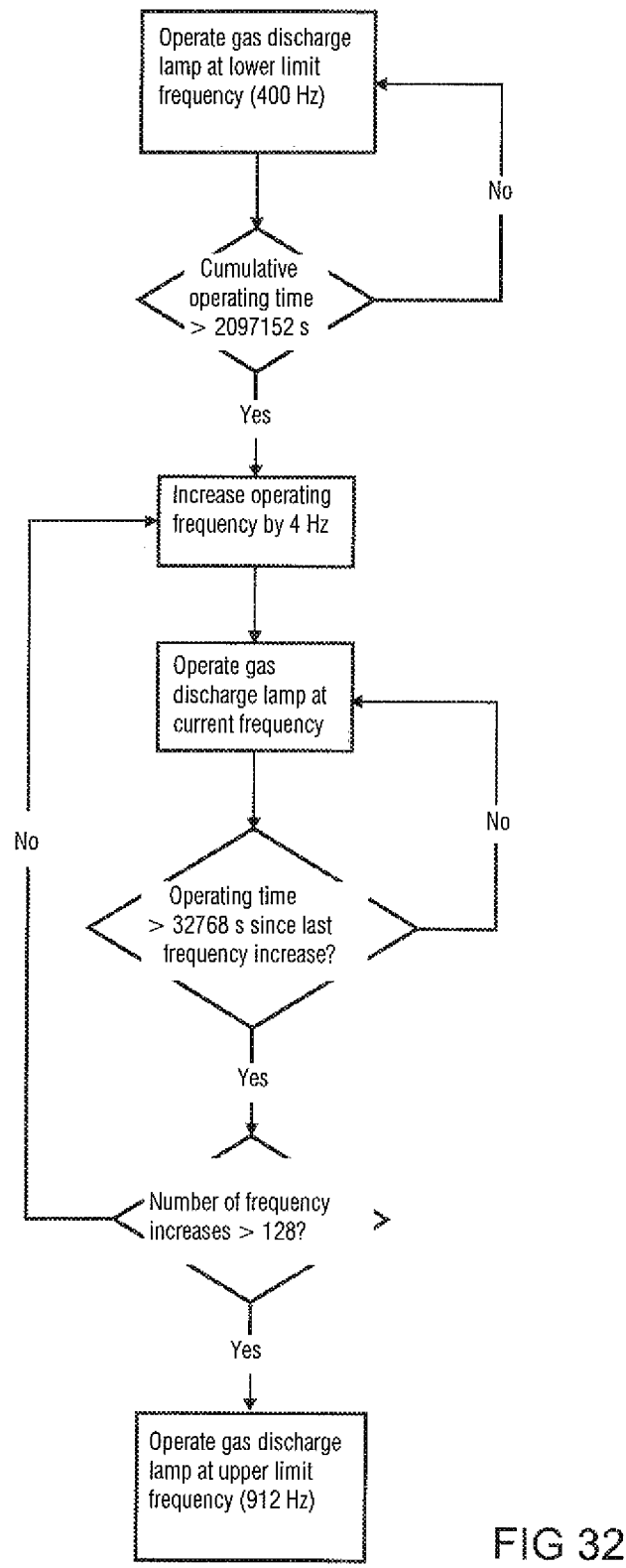
Figure 33:
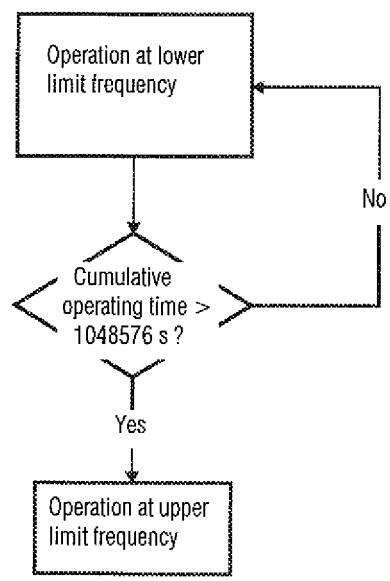
Figure 34:
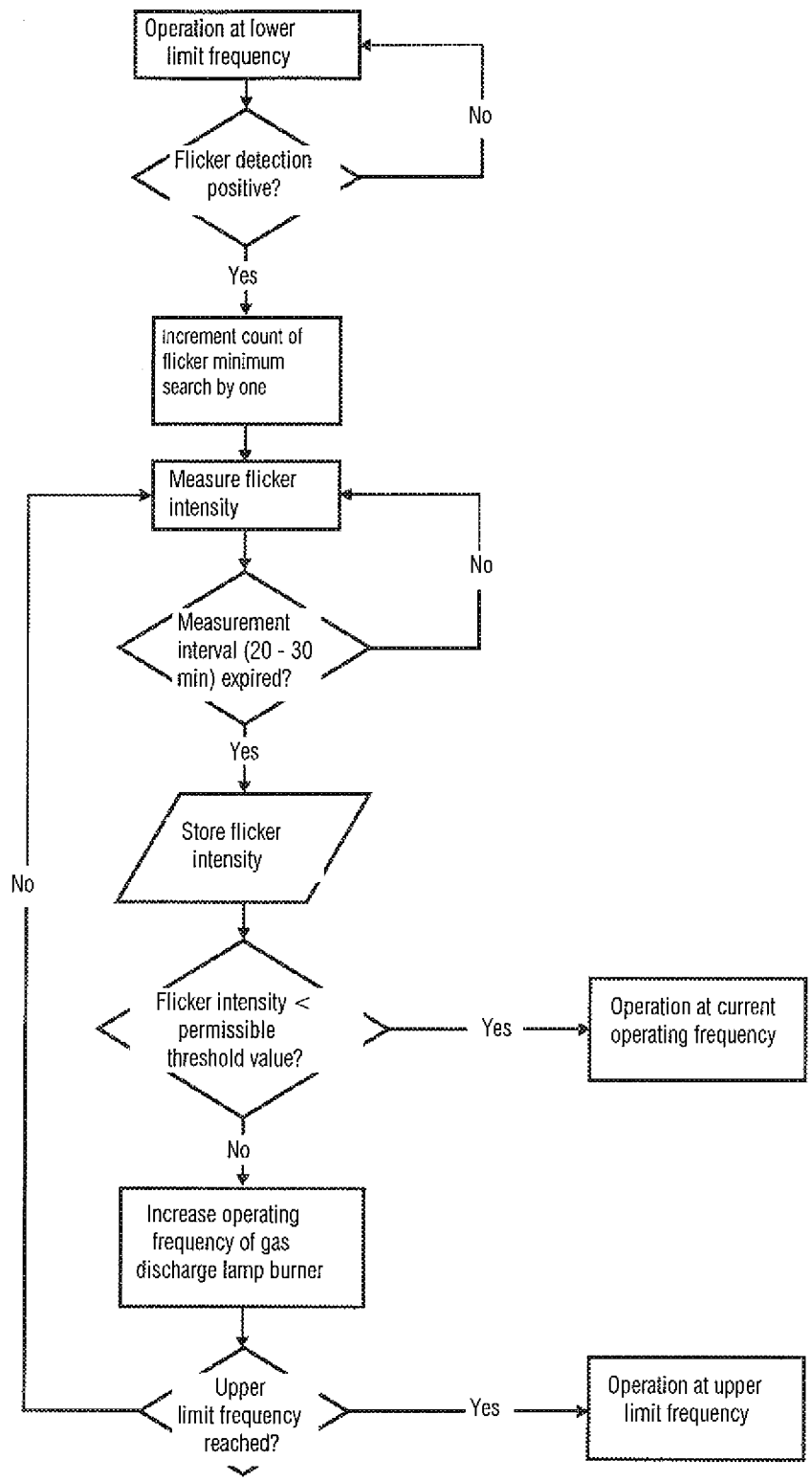

Further advantages, features and details of the invention will emerge from the following description of exemplary embodiments and with reference to the accompanying drawings in which the same or functionally identical elements are provided with identical reference characters and in which:

FIG. 1 shows a sectional view of an integrated gas discharge lamp according to the invention in a first embodiment, FIG. 2 shows an exploded view of the mechanical components of the integrated gas discharge lamp in the first embodiment, FIG. 3 shows a sectional view of an integrated gas discharge lamp according to the invention in a second embodiment, FIG. 4 shows a perspective view of an integrated gas discharge lamp according to the invention in a second embodiment, FIG. 5 shows a view of the headlight/gas discharge lamp interface, FIG. 6 shows a detail view of the electrical contact-making, FIG. 7 shows a detail view of the mechanical contact-making, FIG. 8 shows a sectional view of a third embodiment of the integrated gas discharge lamp, FIG. 9 shows a perspective view of an integrated gas discharge lamp according to the invention in a fourth embodiment, FIG. 10 shows a perspective view of an ignition transformer of the integrated gas discharge lamp, FIG. 11 shows a perspective view of the upper section of the ignition transformer, FIG. 12 shows a perspective view of the lower section of the ignition transformer, FIG. 13 shows a perspective view of the lower section of the ignition transformer with secondary winding visible, FIG. 14 shows an exploded view of the ignition transformer in a second circular embodiment, FIG. 15 shows a sectional view of the ignition transformer in a second circular embodiment, FIG. 16 shows an exploded view of the ignition transformer in a third circular embodiment with two-turn primary winding, FIG. 17 shows a sectional view of the ignition transformer in a third circular embodiment with two-turn primary winding, FIG. 18a shows a schematic circuit diagram of asymmetrical pulse ignition according to the prior art, FIG. 18b shows a schematic circuit diagram of symmetrical pulse ignition device according to the prior art, FIG. 19 shows a schematic circuit diagram of an asymmetrical pulse ignition device, FIG. 20 shows a schematic circuit diagram of an extended circuit of the integrated gas discharge lamp, FIG. 21 shows a sectional view of the gas discharge lamp burner of the integrated gas discharge lamp including the base design, FIG. 22 shows a diagram of the operating frequency of the gas discharge lamp burner over its operating time, FIG. 23 shows a circuit topology for an operating mode with straightened discharge arc in a first embodiment, FIG. 24 shows a circuit topology for an operating mode with straightened discharge arc in a second embodiment, FIG. 25 shows a circuit topology for an operating mode with straightened discharge arc in a third embodiment, FIG. 26 shows a circuit topology for a simplified operating mode of a DC/DC converter, FIG. 27 shows a graph indicating the functional relationship between the normalized required operating power and the cumulative weighted operating time of the gas discharge lamp burner, FIG. 28 shows a graphical representation of the weighting function $\gamma$, FIG. 29 shows a graphical representation of the function $\alpha$, FIG. 30 shows a graphical representation of the normalized required luminous flux as a function of the normalized cumulative operating time of the gas discharge lamp burner, FIG. 31 shows a sectional view of an integrated gas discharge lamp according to the invention in a fifth embodiment, FIG. 32 shows a flow chart of a variant of a first embodiment of a method for operating an integrated gas discharge lamp, FIG. 33 shows a flow chart of another variant of the first embodiment of the method for operating an integrated gas discharge lamp, FIG. 34 shows a flow chart of a second embodiment of a method for operating an integrated gas discharge lamp.

DETAILED DESCRIPTION OF THE DRAWINGS

Mechanical Integration

FIG. 1 shows a sectional view of a first embodiment of the integrated gas discharge lamp 5. The term integrated gas discharge lamp 5 will be used hereinafter to denote a gas discharge lamp 5 which has both the ignition electronics and the operating electronics integrated in the base of the gas discharge lamp 5. The integrated gas discharge lamp 5 therefore no longer has a specific lamp interface to the outside, but can be connected directly to normal, widely available power supply systems. In an embodiment as a vehicle headlight lamp, the interface of the integrated gas discharge lamp 5 is therefore the conventional 12 V supply of the vehicle electrical system. In another embodiment as an automotive lamp, the interface of the integrated gas discharge lamp 5 can also be a future 42 V supply of a modern vehicle electrical system. However, the integrated gas discharge lamp 5 can also be designed for connection to the high voltage electrical system of an electric car with a battery voltage of e.g. 48 V, 96 V, 120 V right up to 360 V, for example. In addition, the integrated gas discharge lamp can be designed to operate from an emergency power supply with a battery-backed low voltage system. This lamp can likewise be used in low voltage standalone systems such as those used on mountain huts, for example. Also conceivable as an application are conventional low voltage systems in which low voltage halogen lamps have hitherto been used. Such a lamp is advantageous even in portable devices such as flashlights, as no wiring is required between lamp and operating device, thereby eliminating additional costs, wiring complexity and unnecessary sources of faults. In the following description, an integrated gas discharge lamp 5 is therefore taken to mean a gas discharge lamp having all the electronics necessary for operation integrated in the lamp itself, so that it can be connected directly to a conventional supply.

A lamp burner 50 is held in place by a metal clip 52 mounted on 4 retaining plates 53. The retaining plates 53 are cast integral or injection molded into a lamp base 70. The lamp base 70 is preferably made of plastic and is produced by injection molding or a casting process. In order to improve the electrical shielding, the plastic of the lamp base 70 can be electrically conductive or metalized. Particularly advantageous is metallization of the lamp base on the outer side, i.e. on the side facing away from the ignition and operating electronics 910, 920. In addition to metallization, overmolding of metal conductors or of a metal braid is also possible, so that an electrically conducting skin is produced in the wall of the lamp base 70. If conductive or metalized plastic is not used, the plastic base is enclosed with an electrically conductive housing 72 made of a conductive material such as metal, for example. Said metal can be e.g. a corrosion-protected sheet iron or even a nonferrous metal such as aluminum, magnesium or brass. Mounted at the burner end of the electrically conductive housing 72 is a sealing ring 71, also commonly known as an O-ring, which implements a seal with respect to the reflector. This enables a leak-tight headlight system to be constructed without having to install the lamp in its entirety in a sealed headlight. As the lamp sits outside the headlight, the cooling of ignition and operating electronics 910, 920 located in the base is significantly better and simpler than with a conventional design in which the gas discharge lamp 5 is installed in a sealed headlight in which only convection can take place, producing a weak cooling effect. The virtually stagnant air inside the sealed headlight described causes a build-up of heat which results in much higher temperatures of the operating electronics than in the proposed design in which the lamp projects into the open, e.g. into the engine compartment, on the side facing away from the light emitting surface.

The base 70 is closed on the side facing away from the lamp burner 50 by a base plate 74. The base plate 74 preferably consists of a material having good thermal and electrical conductivity, such as aluminum or magnesium. In order to establish a mechanical connection to the base 70 and an electrical connection to the electrically conductive housing 72, the latter has on the side facing away from the lamp burner 50 a plurality of lugs 722 which are flanged onto the base plate 74 during assembly of the integrated gas discharge lamp 5 so as to establish the required connections. By means of a connection technique of this kind among other things, the lamp burner 50, ignition electronics 910 and operating electronics 920 are inseparably interconnected to produce an integrated gas discharge lamp 5. This has the advantage for the motor vehicle manufacturer that, in contrast to conventional systems consisting of operating electronics and gas discharge lamp, the integrated gas discharge lamp 5 is only one part both in terms of logistics and assembly, the lower complexity results in reduced costs, and any risk of confusion between components of identical function but different form, such as different product versions of the operating devices, is eliminated. For the end user, e.g. the vehicle owner, this provides the advantage that the reduced complexity greatly simplifies and speeds up the replacement of a defective integrated gas discharge lamp compared to the prior art, facilitates troubleshooting and less knowledge and skill are required for changing a lamp. The absence of cabling and connectors between the components additionally brings down the costs, increases the reliability and reduces the weight.

The base plate is preferably made from die cast aluminum or die cast magnesium. This is an inexpensive variant which is also of mechanically and electrically high quality. A good electrically conductive connection between the at least superficially electrically conductive lamp base 70 or the electrically conductive housing 72 and the likewise electrically conductive base plate 74 is particularly necessary for good electromagnetic shielding. This shielding prevents interference with adjacent electrical or electronic modules. The shielding additionally ensures that these modules have no adverse effect on the functioning of the ignition and operating electronics 910, 920. Disposed between the base plate 74 and the base 70 is a sealing ring 73 ensuring a water- and air-tight connection between the base 70 and the base plate 74. In an alternative embodiment, the base 70 and the base plate 74 are implemented such that both parts are interlockable and, in the locked position, there are one or more points of contact between the electrically conductive housing 72 and the base plate 74 in order to produce a good connection for the electrical shielding. Here too there is again disposed between the base and base plate a sealing ring ensuring the leak-tightness of the base on the side facing away from the gas discharge lamp burner 50. Inside the base 70, two planes are provided which accommodate the ignition and operating electronics. A first smaller plane closest to the lamp burner 50 accommodates the ignition electronics 910 with the ignition transformer 80. The design of the ignition transformer 80 will be described in greater detail below. A second larger plane accommodates the operating electronics 920 necessary for operating the discharge lamp burner 50. The ignition and operating electronics can be mounted on any suitable kind of circuit board. Possibilities include conventional circuit boards, metal core circuit boards, circuit boards in LTCC technology, oxidized or coated metal boards with traces in thick film technology, plastic circuit boards in MID or MID hot stamping technology or other possible technologies suitable for producing temperature resistant circuit boards. The electronic components and devices constituting the ignition and operating electronics can be located on the upper and underside as well as inside the two circuit boards. For the sake of clarity, FIG. 1 shows, apart from the transformer 80, no other electronic components or devices on the circuit board. Provided that the circuit board for the ignition electronics 910 and the circuit board for the operating electronics 920 consist of the same material, they can advantageously be fabricated on the same panel. Links can be inserted between the boards, said links being used as electrical connections between the boards on depaneling and mounting in the lamp base 70. Individual wires, ribbon cable or rigid-flex circuit boards, for example, can be used as links. Said electrical connection of the two circuit boards is designed to withstand, undamaged, a change in the spacing between the two circuit boards of the ignition and operating electronics caused by thermal expansion, particularly cyclic stress. For this purpose, for example, the wires must be provided with sufficient length and appropriate installation within the housing. Alternatively, one or more plug and socket connectors, for example, can be used which are dimensioned and disposed so as to permit thermal expansion of the two circuit boards in the direction of the longitudinal axis of the gas discharge lamp burner, yet ensure an electrical connection in all cases. To this end, for example, the pins of the plug connector are disposed perpendicular to the respective circuit board surface and the insertion length of the sockets is dimensioned so as to provide more travel for the pins than they require to allow for thermal expansion inside the sockets.

The circuit board for the ignition electronics 910 has, on the side facing the operating electronics, an electrically conducting shielding surface in order to keep interference caused by the high voltage in the ignition electronics as far away as possible from the operating electronics. In the case of a metal or metal core circuit board, this surface is inherently present, but for other circuit board materials a copper surface or similar is applied to this side. If a metal core board is used, this can also be used to cool the ignition transformer 80 which is exposed to particularly high thermal stress because of its proximity to the gas discharge lamp burner 50. An electrically conducting shielding surface between the ignition electronics 910 and the operating electronics 920 can alternatively also be provided by a metal plate which is inserted between the two circuit boards and is advantageously connected to the electrically conductive housing 72 in an electrically conducting manner. If said shielding surface is also to be used for cooling the ignition transformer 80, it is advantageous if the metal plate also has a good thermal connection e.g. through a heat transfer foil or heat transfer paste to the electrically conductive housing 72.

The circuit board for the operating electronics 920 is clamped between the base 70 and the base plate 74. The circuit board for the operating electronics 920 has circumferential ground traces around its perimeter on the upper and underside, so called ground rings, which are interconnected in an electrically conducting manner by means of vias. These vias are electrical contacts passing through the circuit board.

By means of the clamping between the base 70 and the base plate 74, said ground rings establish electrical contact with the base plate 74, thereby ensuring the grounding connection of the operating electronics 920 to the electrically conductive housing 72 via the flanged lugs 722.

FIG. 2 shows an exploded view of the mechanical components of the integrated gas discharge lamp 5 in the first embodiment. Here the base is square, but in principle it can also have many other suitable shapes. Other particularly advantageous embodiments would be circular, hexagonal, octagonal or rectangular. To determine the external contour of the embodiment, a cut perpendicular to the longitudinal axis of the gas discharge lamp burner 50 is notionally made through the housing section containing the electronics and the resulting external contour is considered, wherein roundings at the housing edges are disregarded. In the case of the first embodiment shown in FIGS. 1 and 2, two squares are obtained depending on whether the intersecting plane selected is closer to the ignition electronics 910 or closer to the operating electronics 920. The first embodiment is therefore a square embodiment. The first resulting external contour close to the ignition electronics 910 is smaller than the second, which is basically due to the fact that the circuit board of the ignition electronics 920 has smaller dimensions than that of the operating electronics 910. However, this is not necessarily the case and an embodiment in which both external contours are of the same size, and there is consequently a single external contour, is possible. Also the two geometries of the external contours need not be identical in the different regions. In particular, a small, circular external contour in the region of the ignition electronics and a larger, hexagonal external contour in the region of the operating electronics appears to be a particularly advantageous embodiment.

The circuit board for the operating electronics 920, as already explained above, is clamped between the base 70 and the base plate 74. Like the circuit board for the operating electronics 920, the sealing ring 73 is mounted between the base 70 and the base plate 74 and is disposed outside the circuit board for the operating electronics 920.

FIG. 3 shows a sectional view of a second embodiment of the integrated gas discharge lamp 5. As the second embodiment is similar to the first embodiment, only the differences with respect to the first embodiment will therefore be described. In the second embodiment, the ignition electronics 910 and the operating electronics 920 are disposed as combined operating electronics 930 in a common plane on a circuit board. This enables the base of the gas discharge lamp 5 according to the invention to be flatter, which means that a headlight using this gas discharge lamp 5 is likewise less deep. The ignition transformer 80 is here located centrally below the gas discharge lamp burner 50, the center of the ignition transformer 80 being preferably on the longitudinal axis of the gas discharge lamp burner 50. The power supply lead for the gas discharge lamp burner electrode near the base projects into the central section of the ignition transformer. The ignition transformer is not mounted on the circuit board, but sits with its end distant from the gas discharge lamp burner approximately at the same height as the side of the circuit board facing away from the gas discharge lamp burner. For this purpose, the circuit board of the combined operating electronics 930 is recessed at this location, so that the ignition transformer 80 is inserted into the circuit board of the combined operating electronics 930. To improve electromagnetic compatibility, the housing can be provided with walls and chambers e.g. by means of dividers made of aluminum sheet or mu-metal, thereby providing electrical, magnetic and electromagnetic shielding of different circuit sections from one another and from the ambient environment. The shielding can also be achieved by other means; in particular, cavities can easily be implemented in the base plate 74 and in the lamp base 70 as part of the injection molding process.

The remaining voids within the housing of the integrated gas discharge lamp 5, particularly around the ignition transformer 80 and on both sides of the combined operating electronics 930, are filled with potting compound. This has a plurality of advantages: for example, electrical arcing caused in particular by the high voltage produced by the ignition transformer is reliably prevented, good heating of the electronics is ensured, and a very rugged mechanical unit is created which is particularly resistant to environmental effects such as humidity and high accelerations. However, particularly to reduce the weight, only partial encapsulation e.g. in the area of the ignition transformer 80 can also be implemented.

FIG. 8 shows a third embodiment of the integrated gas discharge lamp 5 according to the invention. As the third embodiment is similar to the first embodiment, only the differences with respect to the first embodiment will be described. In the third embodiment, the base plate 74 is provided with cooling fins on its outer side. It is also conceivable for the lamp base 70 and the electrically conductive housing 72 also to be provided with cooling fins in each case. In addition, the function of the circuit board of the operating electronics 920 is likewise fulfilled by the base plate, as the latter has electrically non-conducting areas on its inner side, e.g. areas of anodically oxidized aluminum, which are provided with conducting patterns, e.g. traces in thick film technology, and which are connected in an electrically conducting manner, e.g. soldered, to the components of the combined operating electronics. This provides particularly good cooling of the operating electronics 920, as they are mounted directly on a heat sink. The cooling fins are preferably implemented so as to promote natural convection in the installed position of the integrated gas discharge lamp 5. If the integrated gas discharge lamp 5 is to be able to operate in different installed positions, the cooling surface can also be designed accordingly and consist e.g. of circular, hexagonal, square or rectangular fingers, so that natural convection can take place in a plurality of spatial directions. As in the first embodiment, the ignition electronics 910 are accommodated on an overlying circuit board and are electrically connected to the operating electronics 920 by suitable means. This can be accomplished by spring-loaded or plug-in contacts, but also by traces running in the base or traces impressed on the inside of the base which are connected to the ignition electronics 910 and the operating electronics 920.

FIG. 9 shows a fourth embodiment of the integrated gas discharge lamp 5 according to the invention. As the fourth embodiment is similar to the second embodiment, only the differences with respect to the second embodiment will be described. In the fourth embodiment, the base plate 74 is implemented by a metal core board populated on the inside and therefore likewise on one side as in the previous example. However, the base plate 74 is no longer a plate as in FIG. 4 but a base cup with raised side walls. For reasons of clarity, the base plate will hereinafter be referred to as the base cup. The base cup can likewise consist of a material with good thermal conductivity. Particularly well suited are metal alloys that can be readily re-formed, e.g. by deep drawing. Likewise well suited is a plastic with good thermal conductivity that can be shaped by injection molding. In this embodiment, the base 70 with the reference ring 702 and the reference protrusions 703 essentially consists of a hexagonal plate on which the burner is adjusted and fixed inside the reference ring. The base cup accommodates the combined operating electronics 930 which are located on a separate circuit board or on the internal floor of the base cup. The power supply leads 56, 57 of the gas discharge lamp burner 50 are provided with plug-in contacts which, during assembly of the base cup and the base 70, engage in corresponding mating contacts of the base cup and establish reliable contact.

If the base cup and the base 70 are made of metal, the two parts can be connected by flanging as in the case of a coffee tin or tin can. However, as shown in FIG. 9, it is also possible merely for a plurality of lugs of the base cup to be flanged onto the base in order to produce a good mechanical and electrical connection. However, well known soldering and welding methods can also be used to establish the connection.

If the base cup and the base 70 are made of plastic, the connection can preferably be made by ultrasonic welding. This produces a reliable and permanent connection which, in the case of a conductive plastic, also provides a conductive connection. However, the connection can likewise be made by appropriate snap-ins, for which purpose corresponding snap tabs and recesses must then be provided on the base cup and the base 70 respectively.

The diameter (D) and height (h) of the integrated gas discharge lamp 5 shall now be defined to a large extent independently of the geometry in order to simplify the description. The height (h) of the integrated gas discharge lamp is understood as meaning the maximum distance of the reference plane, which will be explained in greater detail below, from the outer side of the base plate (74) facing away from the burner. The diameter (D) is taken to mean the longest straight-line segment within the integrated gas discharge lamp, said segment lying within any plane, and said plane running parallel to the reference plane.

The following table show a number of geometric variables of different designs of the fourth embodiment of the gas discharge lamp 5 as shown in FIG. 9:

| Diameter | Length or height h | Volume | Weight | D/h |
|---|---|---|---|---|
| A. 50 W lamp | | | | |
| 100 | 35 | 275 | 510 | 2.86 |
| B. 35 W lamp | | | | |
| 100 | 25 | 196 | 178 | 4.00 |
| C. 25 W lamp, standard variant | | | | |
| 70 | 25 | 99 | 139 | 2.80 |
| D. 18 W lamp, superflat variant | | | | |
| 100 | 15 | 120 | 168 | 6.67 |
| E. 45 W lamp, coffee tin variant | | | | |
| 40 | 50 | 63 | 52 | 0.80 |
| F. 7 W lamp, for use in flashlight | | | | |
| 40 | 35 | 44 | 36 | 1.14 |

The electrical powers of 7 to 50 W of the different designs as shown in the table relate to the nominal wattage of the gas discharge lamp burner. Different geometries and sizes of the same type of gas discharge lamp burner are used.

As can be clearly seen in FIG. 4, the lamp base of the integrated gas discharge lamp 5 according to the second and fourth embodiment has a hexagonal shape which offers several advantages. On the one hand, the integrated gas discharge lamp 5 is thus easily grippable in order to insert it in its intended location. On the other hand, the panel of the circuit board of the integrated combined operating electronics 930 can be arranged such that there is little cutting waste and so good cost efficiency is possible. Due to the flat design of the base, a very compact headlight can be created, which is advantageous particularly for modern motor vehicles. In this application, the point symmetric hexagonal shape enjoys all the advantages of a circular shape, but without its disadvantages.

As shown in FIGS. 3 and 4, on one side of the lamp base 70, contacts 210, 220 project from the base radially to the longitudinal axis of the gas discharge lamp burner 50. They are used for establishing electrical contact between the integrated gas discharge lamp 5 and a headlight. These contacts are overmolded as part of a plastic injection molding process during manufacture of the lamp base 70. The advantage of this that no particular connector system is required, yet the water- and air-tight encapsulation of the kind already described above can nevertheless be ensured.

Headlight Interface

The interaction between integrated gas discharge lamp 5 and headlight 3 is shown in FIG. 5. The gas discharge lamp 5 in the second embodiment possesses a special electrical interface via which it can be supplied with electric power. The electrical interface is designed such that when the gas discharge lamp 5 is inserted into a headlight 3 it is not only connected to the headlight 3 mechanically but at the same time electrically. A similarly designed interface is also used in modern halogen lamps for automotive headlights and marketed e.g. by Osram under the name "Snap Lite". When the integrated gas discharge lamp 5 is therefore inserted into a reflector or headlight, during the insertion process all the mechanical and electrical contacts required for correct operation are connected to their corresponding mating contacts provided in the headlight 3. At its interface to the headlight 3, the base 70 has protrusions 703 projecting from a reference ring 702 which define a reference plane. A detail view is shown in FIG. 7. When the integrated gas discharge lamp 5 is inserted, these three protrusions lie against the corresponding counterpart of the headlight 3. The electrodes or rather the discharge arc of the gas discharge lamp burner 50 are adjusted with respect to the reference plane during the manufacturing process of the integrated gas discharge lamp 5. As a result, the arc of the integrated gas discharge lamp 5 when inserted into the headlight assumes a defined position in the reflector which allows precise optical imaging. In the second embodiment according to FIGS. 3 & 4, the lamp is installed in the headlight by inserting the lugs 704 projecting laterally from the reference ring through the base of a reflector 33 of the headlight 3. The integrated gas discharge lamp 5 is then rotated relative to the reflector 33, whereupon the protrusions 703 mounted to the base-side surface of the lugs 704 pull the integrated gas discharge lamp inward and, at the end of the rotation, snap into reference surfaces provided for that purpose on the reflector base. The sealing ring 71 is compressed and tensions the system such that the protrusions 703 are pressed against the reference surfaces located in the reflector base. The position of the integrated gas discharge lamp 5 and therefore of the discharge arc of the gas discharge lamp burner 50 is thus precisely adjusted and fixed with respect to the reflector 33. The high repeatability of the mechanical positioning of typically better than 0.1 mm in all three spatial directions of the headlight interface described enables an optically excellent headlight system to be implemented. Such a headlight system can be used in particular in a motor vehicle, as it is characterized in the corresponding design by a distinctive and well defined light/dark boundary.

A suitable headlight 3 for this purpose has a light-directing means in the form of a reflector 33, a mount for the integrated gas discharge lamp 5, and a supporting structure 35 on which is disposed a connection element with mating contacts for the electrical contacts 210, 220, 230, 240 of the integrated gas discharge lamp 5. The electrical contacts 210, 220, 230, 240 of the integrated gas discharge lamp 5 project from the lamp base 70 radially with respect to the longitudinal axis of the gas discharge lamp burner 50. They are used to supply electric power to the combined operating electronics 930. After mounting of the integrated gas discharge lamp 5 in the headlight by means of an assembly process essentially based on an insertion movement followed by a clockwise rotation, its contacts 210, 220, 230, 240 are disposed in the slots 351, 352 of the connection element 35, as can be seen in the detail drawing in FIG. 6. Said slots 351, 352 are slots for the electrical contacts 350 for mating with the contacts 210, 220, 230, 240 of the integrated gas discharge lamp 5, thereby eliminating the connectors provided with connecting cables for contacting the integrated gas discharge lamp 5 in the headlight according to the prior art. In particular, the electrical contacts of the integrated gas discharge lamp 5, when it is inserted into the headlight, make direct contact with their mating contacts 350 in the connection element on the supporting structure 35. As a result, the mechanical load placed on the electrical connections by free-floating cables is reduced. In addition, the number of connecting cables per headlight is reduced and therefore the risk of confusion during manufacture is also diminished. This measure additionally allows a greater degree of automation for headlight manufacture, as less manual cabling is necessary. Instead of, as according to the prior art, powering all the light sources in the headlight by means of a connector plugged into the lamp base and a connecting cable, it suffices in the case of the headlight according to the invention to connect existing electrical supply contacts of the headlight to the vehicle electrical system voltage in order to supply the integrated gas discharge lamp 5 with power. The supplying of the lamps present in the headlight through the supply contacts of the headlight is provided by fixed wiring in the headlight, thereby considerably simplifying the cabling of the headlight 3 or rather of the integrated gas discharge lamp 5.

Another variant of the mechanical adjustment is shown by the first embodiment of the lamp in FIGS. 1 & 2. Here the protrusions 703 are disposed on the side of the reference ring 702 facing the gas discharge lamp burner 50. In this variant the protrusions 703 are located on corresponding opposing surfaces on the back of the reflector in order to define thereby the position of the integrated gas discharge lamp 5 with respect to the reflector 33. Said integrated gas discharge lamp 5 is pressed from the back against the reference surfaces of the reflector 33. However, this variant has the disadvantage that the position between the optically effective inner side of the reflector and the reference surfaces on the back of the reflector must be very precisely toleranced in order to achieve precise optical imaging.

The system of the headlight interface of the second embodiment is likewise suitable for implementing further simplified cabling in modern bus systems. Thus, in addition to the two electrical contacts 210, 220, the integrated gas discharge lamp 5 has other contacts 230, 240 for communicating with the on-board electronics of the motor vehicle. The connection element 35 has two slots 351, 352 with accordingly 2 counter-contacts each. In another exemplary embodiment (not shown) only three electrical contacts are present on the lamp, two used essentially for supplying the lamp's electric power, and one logic input, also termed a remote-enable pin, allowing the lamp to be switched on and off virtually powerlessly by the on-board electronics of the motor vehicle.

In addition to the advantage of eliminating transposition of the electrical connections, this "Snap Lite" interface has yet another advantage: due to the fact that the lamp is only supplied with power when it is located in its intended position in the headlight, the power supply lead 57 facing away from the base of the gas discharge lamp burner 50 can only be touched if the integrated gas discharge lamp 5 is safely out of operation. This significantly increases safety for handling a high pressure discharge lamp of this kind. The simple installation of the integrated gas discharge lamp 5 in the headlight 3 means that the end customer is able to replace such a lamp himself. As a result, the integrated gas discharge lamp 5 is less expensive for the end customer, as he does not need to find a repair shop to replace the lamp.

By inserting the integrated gas discharge lamp 5 into the reflector 33, the ground connection of the lamp to the headlight housing is also established. This can be implemented, for example, by spring steel strips attached to the reflector 33 and connected to vehicle ground potential. When the lamp is inserted into the headlight, the spring steel strips touch the electrically conducting housing surface of the integrated gas discharge lamp 5 and establish an electrical connection between vehicle ground and the internal ground or more specifically the ground shield of the integrated gas discharge lamp. This contacting can take place, for example, on the side wall or on the end face of the housing 72. In the present case, the ground connection is established by means of the sealing ring 71 which is conductive. If the housing surface is not or is not completely electrically conductive, the spring steel strips are contacted on a contact area on the housing surface of the integrated gas discharge lamp. Said contact area or areas have an electrically conducting connection to the internal ground or rather the ground shield of the integrated gas discharge lamp.

Another fifth embodiment with a conventional interface to the headlight is shown in FIG. 31. Here the integrated gas discharge lamp 5 is pressed by the reference surface 702 onto a corresponding opposing surface of the headlight mount by means of a retaining clip 705. The integrated gas discharge lamp 5 is electrically connected to the headlight in a conventional manner. The retaining clip 705 ensures that the integrated gas discharge lamp 5 is well connected by its reference surface 702 to the mount in the headlight, thereby allowing precise alignment of the electrodes in the optical system of the headlight. The electrodes 504 of the gas discharge lamp burner 50 of the integrated gas discharge lamp 5 are adjusted with respect to the reference surface 702 during the manufacturing process of the integrated gas discharge lamp 5. As a result, the arc of the integrated gas discharge lamp 5 assumes a defined position in the reflector when inserted in the headlight, thus enabling precise optical imaging. Due to the spring effect of the retaining clip 705, this imaging is ensured even under difficult conditions that can occur in an automotive headlight, such as vibrations. The retaining clip is in turn hooked into a groove 7051 on the headlight side which holds it secure, but can nevertheless be easily hooked out of same when changing the lamp. At the bottom end, the retaining clip 705 has two kinks 7053 which engage into the base plate 74. However, it is also conceivable for the retaining clip 705 to have no kinks and therefore lie against the fins of the base plate. With the fifth embodiment of the gas discharge lamp 5 according to the invention, a simple and inexpensive connection to a headlight can be implemented which has no limitations of any kind in respect of the positioning accuracy in the optical system of the headlight.

Ignition Transformer

The design of the ignition transformer 80 of the integrated gas discharge lamp 5 will now be explained. FIG. 10 shows a perspective view of the ignition transformer 80 in a first embodiment in which the ignition transformer 80 has a square flat shape. However, other embodiments are also conceivable in which the ignition transformer 80 can have a circular, hexagonal, octagonal or other suitable shape. Other embodiments will be described below. The shape is here taken to mean the footprint of the essentially prismatic outer dimensions of the ignition transformer, roundings at the body edges being disregarded. In the particularly advantageous embodiment shown here, the prism has a low height, in particular a height which is less than ⅓ of the diagonal or rather the diameter of the geometry forming the footprint.

The ignition transformer 80 has a ferrite core 81 comprising a first ferrite core half 811 and an identical second ferrite core half 812. On the sides, the ignition transformer 80 has a plurality of outward pointing lugs 868, 869 which are used for mechanical fastening of the ignition transformer 80.

FIG. 11 shows a perspective view of the upper part of the ignition transformer in which the primary winding and the second ferrite core half 812 are not visible. The first ferrite core half 811 is made up of a square side wall 8112 from which a half hollow cylinder 8110 projects centrally inward. The inner side of the square side wall 8112 has elongated recesses 81121 running from the outside to the inside on the side facing the winding. Through these recesses, an impregnating varnish or potting compound into which the ignition transformer 80 is inserted after final assembly for high voltage insulation, can penetrate into the ignition transformer 80 from outside to inside in order to coat all the turns of the ignition transformer 80 in a uniform manner.

Located at the outer edge between the two ferrite core halves 811, 812 is a primary winding 86 consisting of a punched and bent part formed from a metal plate. The plate is preferably made of a nonferrous metal such as copper, bronze or brass. Said plate is preferably elastically deformable and resilient. The primary winding 86 is essentially a long strip running externally between the two ferrite core halves 811 and 812. In a first variant, the primary winding 86 passes with only one turn via 3 corners of the ignition transformer 80, the fourth corner being open. The metal strip of the primary winding 86 is therefore laid a three quarter turn around the external contour of the ignition transformer and ends in each case a short distance before the fourth corner. The metal strip of the primary winding 86 has the abovementioned lugs 866, 867, 868 and 869 which are mounted in the lateral direction of the metal strip. The four lugs are used for mechanical fastening of the ignition transformer 80, for which purpose they can be e.g. soldered onto a circuit board of the ignition electronics 910 as a flat SMD lug or solder tail. However, the lugs can also have another 90° bend, the lugs then being inserted through the circuit board of the ignition electronics 910 and clinched, twisted or soldered on the other side, as shown in FIG. 12. The two ends of the metal strip of the primary winding 86 are bent outward with an approximately 180° radius so that the ends again face away from the fourth corner. In FIG. 12 the two ends are bent outward by approximately 90° and the radii are denoted by 8620 and 8640 respectively. Mounted at each outer end of the metal strip is a laterally projecting lug 862, 864 used for electrical contacting. FIG. 12 shows an alternative embodiment of the two lugs 862, 864. Stresses in the connection between primary winding and circuit board which may be produced by temperature fluctuations are absorbed by the soft connection by means of the 180° radius of the two radii 8620 and 8640 respectively. The lugs are preferably soldered onto the circuit board of the ignition electronics 910 like an SMD component. Due to the above described 180° bend of the metal strip, the soldered joint is not subjected to the mechanical stresses described, and the risk of soldered joint breakage and fatigue is very greatly reduced. The alternative embodiment of the lugs 862, 864 has another 270° radius in the lug itself which further reduces the mechanical stresses in the assembled state.

Inserted in the center of the hollow cylindrical inner part of the ferrite core is a contact body 85 which establishes electrical contact between the gas discharge lamp burner 50 and the inner end of the secondary winding 87 (not shown). The contact body 85 consists of a bent metal part which is connected to the power supply lead 56 of the gas discharge lamp burner 50 near the base. At its end distant from the burner, the contact body 85 has two roof surfaces for contacting the high pressure discharge lamp electrode. On two opposite sides of the end distant from the burner, the contact body 85 preferably has two roof surfaces 851 and 852 which are pitched toward one another to form a ridge and are shaped at the ends at which the two roof surfaces meet such that a lead-in wire 56 of the high pressure discharge lamp burner 50 is centrally clamped. For this purpose the two roof surfaces 851 and 852 are provided with a V-shaped contour at the ends at which the two roof surfaces 851, 852 meet. However, the contour can likewise be made circular or any other suitable shape. For assembly, the lead-in wire 56 can be inserted through the contact body 85, cut to a predetermined excess length, and then preferably laser welded to the contact body 85.

FIG. 12 shows a perspective view of the lower section of the ignition transformer. The figure shows among other things the second ferrite core half 812 which has an identical shape to the first ferrite core half 811. It is also made up of a square side wall 8122 from which a hollow half cylinder 8120 projects centrally. The inner side of the square side wall 8122 has elongated recesses 81221 running from the outside to the inside. Visible in the figure is the burner-adjacent side of the contact body 85, with its hexagonal open shape, and the lead-in wire 56 passing through it. If the two halves are put together, there is produced internally a hollow cylinder into which the contact body is inserted. After assembly, the ferrite core 81 has the shape of a tape recorder or film spool, except that the external contour is not circular but square with rounded edges.

At the first corner, the ignition transformer has a first return ferrite 814. The second and third corners are likewise provided with a second return ferrite 815 and a third return ferrite 816. The three return ferrites are retained by the primary winding 86. For this purpose the metal strip of the primary winding 86 has, at the three corners, cylindrical, inwardly facing roundings 861, 863 and 865 into which the return ferrites 814-816 are clamped. Due to the resiliently elastically deformable material, the three return ferrites 814-816 remain securely in place during production. The return ferrites constitute the magnetic return path of the ignition transformer 80 by which the magnetic field lines in the magnetic material are retained, and therefore cannot cause interference outside the ignition transformer. This also significantly increases the efficiency of the ignition transformer, particularly also the size of the achievable ignition voltage.

FIG. 13 shows a perspective view of the lower part of the ignition transformer 80 with visible secondary winding 87 as it is inserted into the second ferrite core half 812 of the ignition transformer 80. The secondary winding 87 consists of an insulated metal strip which is wound like a film with a predetermined number of turns onto the film-spool-shaped ferrite core, wherein the high voltage carrying end comes to lie inside, is fed through the central core of the film-spool-shaped ferrite core and is connected to the contact body 85 in an electrically conducting manner. The insulation can be applied all round the metal strip, but can also consist of an insulating foil which is wound together with the metal strip. Said insulating foil is preferably wider than the metal strip in order to ensure a sufficient insulation distance. The metal foil is wound with the insulating foil such that it comes to lie in the center of the insulating foil. This produces in the winding form a spiral-shaped gap which, after impregnation with the impregnating varnish or encapsulation with the potting compound, is filled up and thus provides excellent insulation of the secondary winding 87.

The secondary winding 87 is connected to the contact body 85 by its inner high voltage carrying end 871. The outer low voltage carrying end 872 of the secondary winding 87 is connected to the primary winding 86. The connections can be established by soldering, welding or any other suitable joining technique. In the present embodiment, the connections are laser welded. For this purpose, two spots per end are preferably applied which interconnect the two parts in a secure and electrically conducting manner. Said inner end 871 of the secondary winding 87 extends through the two hollow cylinder halves 8110, 8120 of the ferrite core 81 and is gripped by them. The outer end 872 of the secondary winding 87 is connected to the end of the primary winding 86 such that the winding sense of the secondary winding 87 is counter to the winding sense of the primary winding 86. However, depending on the requirement, the outer end of the secondary winding 87 can also be connected to the other end of the primary winding 86 so that the winding sense of the primary and secondary windings is the same.

The diameter and height of the ignition transformer 80 which is accommodated in the integrated gas discharge lamp 5 shall now be defined largely independently of its geometry and on the basis of the dimensions of the ferrite core in order to be able to provide a simpler description. The height of the ignition transformer is to be understood as meaning the distance between the two outer surfaces, distant from the winding in each case, of the two side walls, which corresponds approximately to the sum of twice the thickness of a side wall and the width of the winding. In the following, the diameter of the ignition transformer 80 shall be taken to mean the longest straight line segment within one of the two side walls irrespective of the shape of the side walls, said straight line segment lying within any plane, and said plane running parallel to the outer surface of the respective side wall.

In a particularly advantageous embodiment, the ferrite core of the ignition transformer has a height of 8 mm and a diameter of 26 mm. The side walls have diameter of 26 mm and a thickness of 2 mm and the central core a diameter of 11.5 mm with a height of 6 mm. The secondary winding consists of 42 turns of a Kapton foil 5.5 mm wide and 55 μm thick to which a 4 mm wide and 35 μm thick copper layer centered in the longitudinal direction is applied. In another particularly advantageous embodiment, the secondary winding is wound from two separate foils placed one on top of the other, a 75 μm thick copper foil and a 50 μm thick Kapton foil being used. In both embodiments the secondary winding is connected in an electrically conducting manner to the primary winding consisting of one turn, said primary winding being controlled using a pulse generating unit comprising a 800 V spark gap.

FIG. 14 shows an exploded view of the ignition transformer 80 in a second embodiment. As the second embodiment is similar to the first embodiment of the ignition transformer 80, only the differences with respect to the first embodiment will be described below. The ignition transformer 80 in the second embodiment has a circular shape, similar to that of a film spool. Due to the circular shape, the return ferrites 814-816 are omitted and the primary winding 86 has a simpler shape. The laterally protruding lugs for the mechanical fastening of the transformer are here implemented as SMD lugs having a 270° bend in order to protect the soldered joints from excessively large mechanical stresses. The two lugs 862, 864 for the electrical contacting are implemented in the same manner and disposed radially on the circumference of the ignition transformer 80. The ferrite core 82 of the second embodiment is of tripartite design, having a hollow cylinder shaped central core 821 terminated at both ends by circular plates 822. The circular plates 822 come to lie centrally on the hollow cylinder 821, thereby producing the above described film spool shape. The hollow cylinder has a slot 823 (not visible in the figure) in order to be able to introduce the inner end of the secondary winding 87 into the interior of the hollow cylinder.

FIG. 15 shows a section view of the second embodiment of the ignition transformer 80. Here the structure of the ferrite core 81 is readily understandable. Also identifiable in this view is the slot 823 through which the inner end of the secondary winding 87 is introduced.

FIG. 16 shows an exploded view of the ignition transformer in a third circular embodiment with two-turn primary winding. As the third embodiment is very similar to the second embodiment of the ignition transformer 80, only the differences with respect to the second embodiment will be described. In the third embodiment, the ignition transformer 80 has a primary winding with two turns. The metal strip of the primary winding 86 therefore goes barely twice around the ignition transformer. Again mounted at both ends are lugs implemented as an SMD variant for the electrical contacting of the ignition transformer 80. As the lugs for mechanical fastening of the ignition transformer 80 are absent in this embodiment, the ignition transformer 80 must be mechanically fixed in some other way. This can be accomplished, for example, by clamping the ignition transformer 80, as indicated in FIG. 3. The ignition transformer 80 is here clamped between the base 70 and the base plate 74. For this purpose the base plate 74 has a base plate dome 741, a raised portion on the base plate which grips the ignition transformer 80 in the assembled state. The advantage of this design is the good heat dissipation of the ignition transformer 80. The latter can become very hot during operation, as it sits very close to the gas discharge lamp burner 50 of the integrated gas discharge lamp 5. Due to the good thermal conductivity of the base plate 74, some of the heat introduced by the gas discharge lamp burner 50 into the ignition transformer 80 can be dissipated again and the ignition transformer 80 effectively cooled.

FIG. 17 shows a sectional view of the ignition transformer 80 in a third circular embodiment with two-turn primary winding. This sectional view again clearly shows the construction of the ferrite core 82. As in the second embodiment, the ferrite core 82 is composed of three parts, a central core 824 and two plates 825, 826. The central core 824 is likewise hollow cylindrical and has at one end a shoulder 827 which engages into a circular cutout of the first plate 825 and fixes it on the central core 824. A second plate 826 likewise has a circular cutout whose inside radius corresponds to the outside radius of the central core 824. After assembly of the secondary and primary winding, the plate is inserted on the central core and fixed thereby. The plate is inserted until it comes to lie on the secondary winding in order to achieve an optimum magnetic flux in the ignition transformer 80.

Asymmetrical Ignition Pulse

The mode of operation of the ignition device of the integrated gas discharge lamp 5 will now be explained.

FIG. 18*a* shows the schematic circuit diagram of an asymmetrical pulse ignition device according to the prior art. In said asymmetrical ignition device, the ignition transformer $T_{IP}$ is inserted in one of the supply leads of the gas discharge lamp burner 50 which is represented here in equivalent circuit form. This results in an ignition pulse which produces a voltage only in one direction from the reference ground potential which is usually connected to the other supply lead of the gas discharge lamp burner; therefore, either a positive voltage pulse with respect to the reference ground potential or a negative voltage pulse with respect to the reference ground potential is produced. The mode of operation of an asymmetrical pulse ignition device is well known and will not be explained in further detail here. The asymmetrical voltage is well suited to single-ended lamps, as the ignition voltage is only present at one of the two gas discharge lamp burner electrodes. For this purpose, the electrode near the base is generally selected, as it cannot be touched and does not therefore pose a potential risk to humans in the event of improper use. As no voltage hazardous to humans is present on the usually openly routed return conductor, a lamp operated using an asymmetrical ignition device therefore ensures a degree of safety. However, the asymmetrical ignition device has the disadvantage of applying the entire ignition voltage to one gas discharge lamp electrode. This increases the losses due to corona discharges and other effects caused by the high voltage. This means that only a portion of the ignition voltage produced is actually present at the gas discharge lamp burner 50. A higher ignition voltage than is necessary must therefore be generated, which is complex and expensive.

FIG. 18*b* shows the schematic circuit diagram of a symmetrical pulse ignition device according to the prior art. The symmetrical pulse ignition device has an ignition transformer $T_{IP}$ having two secondary windings which are magnetically coupled together with the primary winding. The two secondary windings are aligned such that the generated voltage of the two secondary windings is cumulatively present on the lamp. The voltage is therefore approximately equally distributed to the two gas discharge lamp electrodes.

As already mentioned above, this reduces the losses due to corona discharges and other parasitic effects. The cause of the generally higher ignition voltage in the case of symmetrical pulse ignition only becomes apparent on closer consideration of the parasitic capacitances. For this purpose the equivalent circuit of the gas discharge lamp burner 50 in FIG. 18*b* will be considered. A large if not the largest portion of the parasitic lamp capacitance $C_{La}$ is not caused by the lamp itself but by the connection between lamp and ignition unit, e.g. due to the lamp leads. However, these possess not only parasitic capacitances from conductor to conductor, but also between conductor and environment. If one proceeds for simplicity's sake from a description with concentrated energy stores, the parasitic capacitances between the two conductors or rather the two gas discharge lamp electrodes can be combined to $C_{La, 2}$ as shown in FIG. 18*b*. The parasitic capacitances present between conductor and ambient environment in each case are modeled by $C_{La, 1}$ and $C_{La, 3}$ respectively. In the following, the potential of the ambient environment, e.g. the housing, will be regarded as spatially constant and represented by the grounding symbol even if this need not correspond to the PE or PEN in terms of a low voltage system. In addition, a symmetrical design and therefore $C_{La, 1} = C_{La, 3}$ will be assumed. The parasitic lamp capacitance according to the extended equivalent circuit becomes $C_{La, 2} + \frac{1}{2} C_{La, 1}$ The difference between asymmetrical pulse ignition and symmetrical pulse ignition becomes clear if it is taken into account that both the converter and the ignition unit have parasitic capacitances with respect to ambient. Some of these are intentionally increased (e.g. AC line filter) and are in general significantly greater than the above considered parasitic capacitances of the lamp with respect to ambient; therefore, for simplification, electronics at ambient potential can be assumed for consideration of the ignition. Disregarding the voltage UW, in the case of asymmetrical ignition, $C_{La, 1}$ and $C_{La, 2}$ must therefore be charged to the ignition voltage, whereas, in the case of symmetrical ignition, $C_{La, 2}$ must be charged to the ignition voltage and $C_{La, 1}$ and $C_{La, 3}$ to half the ignition voltage in each case. Assuming a symmetrical design, i.e. $C_{La, 1} = C_{La, 3}$, with symmetrical pulse ignition less energy is therefore required for charging the parasitic capacitances than with the asymmetrical variant. In the extreme case $C_{La, 1} = C_{La, 3} \gg C_{La, 2}$, the ignition unit according to FIG. 18*a* has to provide virtually twice the energy as compared to that shown in FIG. 18*b*.

Another advantage of symmetrical ignition is in the lower required dielectric strength with respect to ambient, as the voltages $U_{Isol, 1}$ and $U_{Isol, 2}$ occurring have only half the value of the voltage $U_{Isol}$ in the case of asymmetrical ignition. This shows both the disadvantage of symmetrical pulse ignition and the reason why it often cannot be used: in the case of symmetrical ignition, both lamp connections carry high voltage, which is often impermissible for safety reasons, as with many lamp or rather base designs one of the two lamp connections, usually the one distant from the lamp, which is then termed the "lamp return conductor" can be touched.

This shows that the symmetrical ignition method is optimally suitable for double-ended gas discharge lamps which are already of symmetrical design in terms of mechanical construction. In the case of a single-ended gas discharge lamp there is, as already mentioned above, the problem of the ignition voltage present at the open, user-accessible gas discharge lamp electrode distant from the base. Another problem is the voltage present at the gas discharge lamp electrode distant from the base with respect to the reflector potential. The reflector in which the gas discharge lamp is installed is usually grounded. At the moment of ignition, a high voltage is therefore present between the return conductor of the electrode distant from the base, and the reflector. This can lead to flashovers onto the reflector, resulting in malfunctions. For these reasons, symmetrical ignition is unsuitable for single-ended gas discharge lamps.

It should also be noted that the insulation cost/complexity increases in a nonlinear manner with the voltage to be insulated. Due to nonlinear effects in insulating materials, for a doubling of the voltage, the distance between two conductors must be more than doubled in order to eliminate flashover/breakdown.

In addition to the above considered, purely capacitive behavior of the ambient environment or more specifically of the insulating materials involved, above a particular voltage or rather the resulting field strengths in the insulating materials and at their interfaces, active power conversion in the insulating materials e.g. due to corona discharges, partial discharges etc. can no longer be disregarded. In the above equivalent circuits, additional nonlinear resistances must be added in parallel with the capacitances. Also in this respect, symmetrical pulse ignition is to be preferred to asymmetrical.

Finally is should be observed that, above a particular voltage load on the insulating material, the latter ages much more quickly and therefore, if the voltage is reduced slightly, a significantly increased service life is already likely.

A good compromise which combines the advantages of the two ignition methods is provided by asymmetrical pulse ignition as schematically illustrated in FIG. 19. It is of similar design to symmetrical ignition, but the two secondary windings have different numbers of turns. The disadvantage of the symmetrical ignition method is primarily that accidental touching of the return conductor during ignition and therefore touching of a high voltage carrying metal part by the user cannot be ruled out. With the integrated gas discharge lamp 5 having the above described headlight interface according to FIG. 5, this can be eliminated, as voltage is not supplied to the electronics until they are inserted into the headlight. It is therefore impossible with the headlight intact to touch the return conductor of the electrode distant from the base when said conductor is carrying voltage. As already mentioned above, symmetrical ignition is also not possible here, as flashovers onto the usually grounded reflector are likely. Asymmetrical ignition is therefore proposed which applies e.g. ¾ of the ignition voltage to the electrode near the base, and e.g. ¼ of the ignition voltage to the electrode distant from the base. The precise voltage ratio between the electrodes of the gas discharge lamp burner 50, i.e. that of the first lamp electrode near the base to the second lamp electrode distant from the base, depends on a large number of factors, the size of the lamp and the construction of the base. The voltage ratio between the first lamp electrode near the base and the second lamp electrode distant from the base can range from 22:1 to 5:4. Voltages of 2.8 kV are preferably generated via the return conductor secondary winding IPSR of the ignition transformer $T_{IP}$, and voltages of 23 . . . 17 kV are preferably generated via the forward conductor secondary winding IPSH of the ignition transformer $T_{IP}$. This produces preferred non-unity transformation ratios between the two secondary windings, namely $n_{IPSR}:n_{IPSH}=2:23\ldots 8:17$. This can also be expressed as an equation $n_{IPSR}=0.04\ldots 0.8*n_{IPSH}$. Although the design is therefore similar to that of a symmetrical igniter, the secondary windings are not uniformly distributed. The number of primary turns $n_p$ of the ignition transformer $T_{IP}$ is preferably between 1 and 4, the sum of the numbers of turns of the two secondary windings IPSH and IPSR is preferably between 40 and 380.

The pulse ignition unit Z in FIG. 19 is widely known from the prior art and will not therefore be explained in greater detail here. It consists of at least one capacitor which is connected to the primary winding of the ignition transformer via a switching element. A switching element with a nominal tripping voltage of between 350 and 1300 V is preferably used here. This can be a switching spark gap or a thyristor with corresponding drive circuit. In the present first embodiment, the ignition transformer $T_{IP}$ has a transformation ratio $n_{IPP}$:$n_{IPSR}:n_{IPSH}$ of 1:50:150 turns, and is operated with an ignition unit Z based on a 400 V spark gap, i.e. with a spark gap with a nominal tripping voltage of 400 V. The ignition transformer $T_{IP}$ delivers a peak voltage of +5 kV with respect to ground to the electrode of the gas discharge lamp burner 50 distant from the base and a peak voltage of −15 kV with respect to ground to the electrode of the gas discharge lamp burner 50 near the base.

In another second embodiment, the ignition transformer is implemented with a transformation ratio of 3:50:100 turns, and is operated with an ignition unit Z based on an 800 V spark gap. This delivers a peak voltage of −8 kV with respect to ground to the electrode of the gas discharge lamp burner 50 distant from the base and a peak voltage of +16 kV with respect to ground to the electrode of the gas discharge lamp burner 50 near the base.

FIG. 20 shows the schematic circuit diagram of an extended circuit of the integrated gas discharge lamp 5. Here one or two non-saturating chokes $L_{NS1}$ and $L_{NS2}$ are connected between the high voltage carrying end of a secondary winding and the respective burner connection in order to prevent interference pulses with high voltage peaks (glitches). Inductance values of 0.5 to 25 µH, preferably 1 to 8 µH, are used. In addition, a high voltage proof capacitor $C_B$ (a so-called "burner capacitor") can be connected directly in parallel with the gas discharge lamp burner and therefore between the gas discharge lamp burner and the non-saturated chokes. Said capacitor usually has a capacitance of less than 22 pF in order not to damp the ignition pulse too strongly. It preferably has a capacitance of between 3 and 15 pF. The capacitor can be implemented by an appropriate arrangement and design of the overmolded lamp supply leads e.g. in the form of plates. The capacitor has two positive effects: on the one hand, it is advantageous for the EMC behavior of the lamp, as high frequency interference produced by the lamp is short circuited directly at source; on the other, it ensures low-resistance breakdown of the burner, which in particular facilitates takeover by the operating circuit 20.

By means of a return capacitor $C_{RS}$ having a capacitance value of preferably between 68 pF and 22 nF, a very low impedance termination of the pulse igniter with respect to the electronic ballast is achieved for the very fast pulses generated by the ignition transformer $T_{IP}$. As a result, the high voltage ignition pulses generated are to a very good approximation completely present at the burner. The return capacitor $C_{RS}$ forms together with a return conductor choke $L_R$ a low pass filter. This counteracts electromagnetic interference and protects the ballast output from impermissibly high voltages. The extended circuit likewise has a current-compensated choke $L_{SK}$ which likewise counteracts electromagnetic interference. A suppressor diode $D_{Tr}$, also known as a clamp diode, limits the voltage resulting from the ignition process at the operating circuit 20, thereby protecting the output of the operating circuit 20.

The gas discharge lamp burner 50 of the integrated gas discharge lamp 5 is fastened to the base 70 by means of a metal clip 52 and four retaining plates 53 (see e.g. FIG. 1). As already indicated in FIG. 20, said metal clip 52 is now grounded, i.e. connected e.g. to vehicle body ground in the case of an integrated gas discharge lamp for motor vehicles. The grounding of the metal clip reliably prevents a flashover from the metal clip to the headlight, as both parts are at the same potential even during ignition. In addition, the grounding of the metal clip produces very good capacitive coupling to an ignition-assisting coating on the gas discharge lamp burner vessel. Such ignition-assisting coatings are often applied in the case of high pressure discharge lamp burners in order to reduce the high ignition voltages. This measure increases the ignition-voltage-reducing property of the ignition-assisting coating on the gas discharge lamp burner vessel. It is particularly advantageous if the capacitive effect of the metal clip on the gas discharge lamp burner (possibly including its ignition-assisting coating) is increased. For this purpose, further electrically conducting parts are directly or capacitively coupled to the metal clip, thereby producing a kind of "third electrode" which consists of a plurality of "intercoupled single electrodes" and is unilaterally grounded. For example, in addition to the metal clip this third electrode can also have a metallic coating 54 on the outer bulb, as indicated in FIG. 21. Said coating can be applied to the outside and/or the inside of the outer bulb. The coating consists of electrically conductive e.g. metallic material and is preferably applied in a strip parallel to the return conductor. This means that the metallic coating 54 does not become visible and also results in a minimal clearance and therefore a maximum coupling capacitance to the ignition-assisting coating on the burner vessel. The coating on the outer bulb can be capacitively or directly coupled to the metal clip. For direct coupling, it is particularly advantageous if the electrical contacting of the outer coating to the metal clip is effected by fixing the burner in the metal clip, which can be implemented without additional cost/complexity by a conventional assembly technique according to the prior art. The coating preferably extends over 1 to 20% of the outer bulb circumference.

The positive effect of the grounded metal clip on the ignition voltage of a gas discharge lamp results from the following physical relationship: due to the fact that with a grounded metal clip and asymmetrical pulse ignition a high voltage is present between the metal clip and both gas discharge lamp electrodes, a dielectrically constrained discharge in the outer bulb is promoted in the vicinity of both gas discharge lamp electrodes. The dielectrically constrained discharge in the outer bulb promotes a breakdown in the burner vessel. This is promoted by the UV light which is produced during the dielectrically constrained discharge and is little absorbed by the burner vessel, and at the electrodes and in the discharge space the generation of free charge carriers is promoted, thereby reducing the ignition voltage.

The metal clip and the reference plane to the reflector of the integrated gas discharge lamp 5 can consist of a metal part which has corresponding retainers which are plastic overmolded and ensure a good mechanical connection to the base 70. The metal clip is then grounded automatically by the insertion of the lamp into the reflector, i.e. into the headlight. This makes the reference plane now more robust to mechanical wear and tear, which is advantageous due to the increased weight of an integrated gas discharge lamp 5. The prior art implementation only provides a plastic injection molded part as a reference plane.

In a preferred embodiment of the integrated gas discharge lamp 5, the base comprises 2 sections: a first section with an already adjusted gas discharge lamp burner 50 which is embedded by means of the metal clip 52 and the retaining plates 53 in a plastic base which has a metal reinforced reference plane as described above. This first section is connected to a second section containing the ignition and operating electronics. The connections for the lamp and the power supply leads can be accomplished by welding, soldering, or by a mechanical connection such as a plug-in contact or an insulation displacement contact.

FIG. 21 shows a gas discharge lamp burner 50 which will now be described. The gas discharge lamp burner 50 is preferably a mercury-free gas discharge lamp burner, but a mercury-containing gas discharge lamp burner can also be used. The gas discharge lamp burner 50 accommodates a gas-tight sealed discharge vessel 502 enclosing electrodes 504 and an ionizable filling for producing a gas discharge, said ionizable filling preferably being a mercury-free filling containing xenon and halides of the metals sodium, scandium, zinc and indium, and the percentage by weight of the zinc and indium halides ranging from 20 to 100, preferably 50, and the cold fill pressure of the xenon gas ranging from 1.3 to 1.8 megapascals. It has been demonstrated that this enables the luminous flux depreciation over time of operation of the gas discharge lamp burner 50 and the increase in the operating voltage of the gas discharge lamp burner 50 over its time of operation to be reduced. This means that, compared with a gas discharge lamp burner according to the prior art, the gas discharge lamp burner 50 has an improved luminous flux maintenance and, and because of the lower operating voltage increase, a longer service life. In addition, over its time of operation the gas discharge lamp burner 50 exhibits only a slight shift in the chromaticity coordinate of the light emitted by it. In particular, the chromaticity coordinate only moves within the permitted limits as laid down by ECE Rule 99. Both the comparatively high cold fill pressure of the xenon and the comparatively high percentage by weight of the zinc halides contribute significantly to the setting of the operating voltage of the gas discharge lamp burner 50, i.e. the voltage which obtains in the quasi steady state operating state across the discharge gap of the gas discharge lamp burner 50 when the ignition phase is complete. The indium halides are present in such a small percentage by weight that, although they contribute to the setting of the chromaticity coordinate of the light emitted by the gas discharge lamp burner, they make no appreciable contribution to the setting of the operating voltage of the gas discharge lamp burner 50. In the gas discharge lamp burner 50, the indium halides are used, like the sodium and scandium halides, mainly for light emission.

The percentage by weight of the halides of zinc is advantageously in the range 0.88 to 2.67 micrograms per 1 $mm^3$ discharge vessel volume and the percentage by weight of the halides of indium is advantageously in the range 0.026 to 0.089 micrograms per 1 $mm^3$ discharge vessel volume. Iodides, bromides or chlorides can be used as halides.

The percentage by weight of the halides of sodium advantageously ranges from 6.6 to 13.3 micrograms per 1 $mm^3$ of the discharge vessel volume and the percentage by weight of the halides of scandium from 4.4 to 11.1 micrograms per 1 $mm^3$ of the discharge vessel volume in order to ensure that the gas discharge lamp burner 50 produces white light with a color temperature of 4000 kelvins and the chromaticity coordinate preferably remains between tight limits during the lifetime of the gas discharge lamp burner 50 in the white light range. If a lower percentage by weight is used, the losses of sodium (caused by diffusion through the discharge vessel wall) and scandium (caused by chemical reaction with the quartz glass of the discharge vessel) can no longer be compensated and, in the case of a higher percentage by weight, the chromaticity coordinate and color temperature are changed.

The volume of the discharge vessel is advantageously less than 23 $mm^3$ in order to get as close as possible to the ideal point light source. For use as a light source in a motor vehicle headlight or other optical system, the light emitting part of the discharge vessel 502, i.e. the discharge space with the electrodes enclosed therein, must be as compact as possible. Ideally the light source should be point-like in order to be able to dispose it at the focal point of an optical imaging system. The high pressure discharge lamp 5 according to the invention comes closer to this ideal than a high pressure discharge lamp according to the prior art, as it preferably has a discharge vessel 502 with a smaller volume. The volume of the discharge vessel 502 of the high pressure discharge lamp 5 therefore advantageously ranges from more than 10 $mm^3$ to less than 26 $mm^3$.

The distance between the electrodes 504 of the gas discharge lamp burner is preferably less than 5 millimeters in order to be able to get as close as possible to the ideal point light source. For use as a light source in a motor vehicle headlight, the electrode spacing is preferably 3.5 millimeters. As a result, the gas discharge lamp burner 50 is optimally suited to the imaging conditions in the vehicle headlight.

The thickness or more precisely the diameter of the electrodes 502 of the gas discharge lamp burner is advantageously in the range from 0.20 to 0.36 millimeters. Electrodes with a thickness within this value range can still be embedded sufficiently securely in the quartz glass of the discharge vessel and at the same time possess adequate current carrying capacity which is particularly important in the so-called start-up phase of the high pressure discharge lamp during which it is operated with 3 to 5 times its nominal power and nominal current. In the case of thinner electrodes, in the present embodiment with mercury-free filling a sufficient current carrying capacity could no longer be guaranteed and in the case of thicker electrodes 504 there would be a risk of crack formation in the discharge vessel, caused by the occurrence of mechanical stresses due to the markedly different thermal expansion coefficients of the discharge vessel material, in this case quartz glass, and the electrode material, in this case tungsten or thorium doped or more precisely thorium oxide doped tungsten.

The electrodes are connected to respective molybdenum foils 506 embedded in the material of the discharge vessel which allow a gas-tight current feedthrough, and the smallest distance of the respective molybdenum foil 506 from the thereto connected electrode end projecting into the interior of the discharge vessel 502 is advantageously at least 4.5 mm in order to maximize the distance between the respective molybdenum foil 506 and the gas discharge starting at the electrode tip projecting into the discharge vessel 502. The resulting, comparatively large minimum distance between the molybdenum foils 506 and the gas discharge has the advantage that the molybdenum foils 506 are exposed to lower thermal stress and less risk of corrosion by the halogens in the halogen compounds of the ionizable filling.

Frequency Adjustment

A method for preventing flicker which is performed by the operating electronics of the integrated gas discharge lamp 5 will now be described.

The gas discharge lamps considered here must be operated with alternating current which is produced primarily by the operating electronics 920. This alternating current can be a high frequency AC, particularly with a frequency above the acoustic resonances occurring in gas discharge lamps, which in the case of the lamps considered here corresponds to a lamp current frequency above approximately 1 MHz. However, low frequency square wave operation is usually used which will now be described.

When operated incorrectly, gas discharge lamps, particularly high pressure discharge lamps, invariably tend to interruption of the arc when the lamp current changes direction, so-called commutation, which is attributable to an excessively low electrode temperature. High pressure discharge lamps are usually operated with a low frequency square wave current, which is also known as "intermittent DC operation". Here an essentially square wave current with a frequency of usually 100 Hz to a few kHz is applied to the lamp. At each switchover between positive and negative driving voltage, which is generally provided by the operating electronics, the lamp current commutates, resulting in a brief zeroing of the lamp current. This mode of operation ensures that the lamp's electrodes are evenly loaded despite quasi DC operation.

The arc root, i.e. the start of the arc on the electrode, is always problematical when a gas discharge lamp is AC operated. With AC operation, the cathode becomes the anode and conversely an anode becomes the cathode during a commutation. The cathode-anode transition is in principle relatively unproblematic, as the temperature of the electrode has next to no effect on its anodic operation. In the case of the anode-cathode transition, the ability of the electrode to deliver a sufficiently high current depends on its temperature. If this is too low, the arc changes during commutation, mostly after the zero crossing, from a point-like arc root mode of operation to a diffuse arc root mode. This change is accompanied by an often visible dip in light emission, which may be perceived as flicker.

The lamp is therefore expediently operated in point-like arc root mode, as the root of the arc is very small here and therefore very hot. Consequently, because of the higher temperature at the small root point, less voltage is required here in order to enable sufficient current to be delivered.

As commutation, the process will now be considered wherein the polarity of the driving voltage of the gas discharge lamp burner 50 changes, and wherein a large current or voltage change therefore occurs. In the case of essentially symmetrical operation of the lamp, the voltage or current zero crossing is in the middle of the commutation time. It should be noted here that voltage commutation usually always proceeds more quickly than current commutation.

From 'The boundary layers of ac-arcs at HID-electrodes: phase resolved electrical measurements and optical observations', O. Langenscheidt et al., J. Phys D 40 (2007), pp. 415-431 it is known that, in the case of a cold electrode and diffuse arc root, the voltage initially rises after commutation, as the overly cold electrode can only deliver the required current by means of a higher voltage. If the device for operating the gas discharge lamp cannot supply this voltage, the abovementioned flicker occurs.

The problem of the changing arc root mode affects mainly gas discharge lamps which have comparatively large electrodes as compared to similar lamps of the same nominal power. Lamps are then typically operated with overload if "instant light" is required, as for example in the case of xenon discharge lamps in the automotive sector, where legal regulations stipulate that 80% of the light output must be attained after 4 seconds. During a so-called "quick start", also known as the start-up phase, these lamps are operated at much higher power than their nominal power in order to meet the relevant automotive industry standards or regulations. The electrode is therefore dimensioned for the high starting power, but is too large in terms of the normal operating state. As the electrode is now heated mainly by the lamp current flowing through it, the problem of flicker occurs predominantly with aging gas discharge lamps whose operating voltage is increased toward the end of their useful lives. Due to the increased operating voltage, a smaller lamp current flows, as the operating electronics keep the lamp output constant during steady state lamp operation by means of closed loop control, which is why the electrodes of the gas discharge lamp are no longer sufficiently heated at the end of its useful life.

With an integrated gas discharge lamp, there is now an advantage in that the operating electronics are inseparably connected to the gas discharge lamp burner, so that the previous operating time, also known as the cumulative operating time $t_k$ obtained by summing all the times in which the gas discharge lamp burner has been operated, irrespective of the intervening times in which the gas discharge lamp burner was not being operated, can be determined in a simple manner by the operating electronics. This can be done e.g. by a timer with nonvolatile memory which always measures the time when the gas discharge lamp burner 50 is being operated, and consequently an arc is burning between the electrodes. As the problem of flicker arises predominantly with older lamps, a method is now proposed whereby the operating frequency with which the gas discharge lamp burner is operated is matched to the operating time of the gas discharge lamp burner such that, as the operating time increases, the operating frequency is also increased. This offers the following advantages: the change between anodic and cathodic operating phase accompanied by temperature modulation of the electrode tips takes place faster the higher the frequency. Consequently, at higher frequency the temperature swing of the electrode tips is less because of their thermal inertia. Surprisingly it has been found that with an electrode temperature which is above a "critical minimum temperature" of the lamp electrodes, no flicker occurs.

The frequency must not, however, be increased arbitrarily, as this could result in excitation of acoustic resonances in the lamp, possibly accompanied by arc deformation and also flicker. This effect is already possible above frequencies of 1 kHz, for which reason a frequency of 400 or 500 Hz is usually selected for normal operation, i.e. after the ignition and start-up phase in the steady sate operating phase. This frequency will hereinafter be referred to as the lower limit frequency. In the following description, the term 'low cumulative operating time' will be regarded as an operating time in which the burner 50 of the gas discharge lamp 5 as yet exhibits few or no aging effects. This is the case until the cumulative operating time reaches approximately the first 10% of the specified lifetime of the gas discharge lamp 5. The term 'nearing the specified lifetime' will be taken to mean a lifetime in which the cumulative operating time is gradually approaching the specified lifetime, e.g. is between 90% and 100% of the specified lifetime. The specified lifetime will be regarded as the useful life specified by the manufacturer.

FIG. 22 shows the graph of a first embodiment of the method, wherein the operating frequency of the gas discharge lamp burner over its operating time is plotted. It may be clearly seen that the operating frequency up to an operating time of 500 h remains constant at 400 Hz, then is progressively increased by 0.5 Hz/h to 900 Hz during the operating time from 500 to 1500 h, thereafter remaining at 900 Hz.

However, the frequency increase in the range 500 to 1500 h need not take place continuously, but can also be staged. Thus, in a second variant of the first embodiment of the method as shown in FIG. 32, from a cumulative operating time of 2097152 s onward, corresponding to approximately 583 h, the frequency is increased by 4 Hz after every 32768 s, corresponding to approximately 9.1 h. The frequency is increased until 128 increases have been performed. The frequency—starting from the original starting value of 400 Hz—will then have reached the value 912 Hz. The second variant of the first embodiment of the method is particularly suitable for implementation by means of digital logic, e.g. by a microcontroller or a digital circuit in an ASIC, as it requires only discrete time and frequency increments.

In the third variant of the first embodiment as shown in FIG. 33, a particularly simple implementation is used. Here, after a time of 1048576 s, corresponding to approximately 291 h, the frequency is doubled from 400 Hz to 800 Hz in one step. The lamp is then always operated at the high frequency. In contrast to the second variant of the first embodiment, only a single frequency increment is involved.

In a second embodiment shown in FIG. 34, the above method is combined with a circuit arrangement for detecting flicker (not shown) in order to enable the frequency to be appropriately matched to the requirements of the lamp burner. Said circuit arrangement for detecting flicker is based on a detection circuit which is used to detect the lamp voltage and/or the lamp current. Alternatively, suitable correlating variables upstream of the inverter can also be used for detection. An electronic operating device or ballast as is normally used in the motor vehicle and can be integrated in the integrated gas discharge lamp 5 as operating electronics 920 possesses a two-stage design consisting of a DC/DC converter and an inverter which are interconnected via a DC link, wherein the voltage change over time of the DC link and/or the current change over time of the current flowing into the inverter from the link can be regarded as a measure for lamp flicker.

The flicker detecting circuit arrangement now detects whether the lamp is flickering. If this is the case and the previous operating time of the lamp is more than 500 h, a flicker mapping method is put into operation.

The method comprises the following steps:
incrementing the count of a flicker minimum search by one
progressively increasing the operating frequency of the gas discharge lamp burner starting from the lower limit frequency,
measuring the flicker intensity at the operating frequency selected.

At least said flicker intensity at the selected operating frequency is stored. If required, other parameters measured at the operating frequency can be stored. The flicker intensity must be measured over a comparatively long period in order to compensate for statistical fluctuations which may occur during operation. In the second embodiment, a measuring time of e.g. 20-30 minutes is envisioned. The frequency is here increased 100 Hz each time, and the flicker intensity is measured. In a first stage, the frequency is increased to a first upper limit frequency of 900 Hz. As soon as the flicker disappears or more precisely the flicker intensity falls below a permissible threshold, the frequency is no longer increased and the present frequency is also stored for future operation in a nonvolatile memory so that the next time the integrated lamp is switched on, start-up takes place with the last frequency used.

If the flicker could not be eliminated, i.e. the flicker intensity could not be reduced below a permissible threshold value despite the frequency being increased to a first upper limit, the count of the flicker minimum search is incremented by one and the frequency is further increased until three times the value of the first upper limit frequency, i.e. in this case 2700 Hz, the so-called second upper limit frequency, is reached. The frequency at which the least flicker has appeared is then specifically selected from the entire measured range between the lower limit frequency and the second upper limit frequency. The flicker intensity associated with the least flicker is multiplied by a factor greater than 1 and the so-called current flicker limit is stored as the new permissible threshold value.

Flicker monitoring and measurement subsequently remain activated and a periodic check is performed to ascertain whether the current flicker intensity is above the current flicker limit. Should this be the case, a jump is made to the frequency which has shown the second-lowest flicker intensities during the above described examination of the lamp as part of this method. The lamp is then operated at this frequency, with flicker monitoring and measurement continuing to remain activated. Should the current flicker intensity now once again be above the current flicker limit, a change to the frequency with the third-lowest flicker intensity takes place. If during subsequent operation the current flicker intensity is again above the current flicker limit, the count of the flicker minimum search is again incremented by one and a new minimum search operation is initiated wherein the entire frequency range between the lower limit frequency and the second upper limit frequency is scanned.

The count indicating how often the flicker minimum search has already been activated as well as the current flicker limit are stored in a nonvolatile memory of the operating electronics (920, 930). These two values can be read out via the communications interface of the integrated gas discharge lamp, e.g. via a LIN bus. In the context of motor vehicle maintenance, e.g. as part of regular servicing, or because the vehicle is in the repair shop owing to a defect, the two values are read out and compared with limit values which represent the values that are still acceptable. The limit values can likewise be stored in the integrated gas discharge lamp and read out via the communications bus, but in this embodiment they are stored for simplicity's sake in the repair shop's diagnostic equipment. If one of the values read out is above the associated limit value, the integrated gas discharge lamp (5) must be replaced by a new integrated gas discharge lamp. This approach significantly increases the availability of the lighting system without incurring appreciable costs, as the lamp will not be changed unnecessarily early and no appreciable additional time is required during maintenance, as the vehicle is will be connected to the diagnostic equipment anyway.

The limit values with which the data from the nonvolatile memory of the operating electronics is compared can be modified as a function of the cumulative operating time ($t_k$) or cumulative weighted operating time ($t_{kg}$) likewise read out from the nonvolatile memory, so that, for example, the flicker limit of an old lamp may be higher than that of a new lamp without the lamp having to be replaced. The limit values as a function of the operating time of the lamp are supplied by the lamp manufacturer to the motor vehicle manufacturer so that the latter can import the data to his diagnostic equipment e.g. in the form of a table or data matrix.

In a third embodiment, the approach is similar to the second embodiment, except that, particularly to save memory in the microcontroller, only the value of the hitherto minimum occurring flicker intensity and the associated operating frequency is stored in the case of the above described search. In other words, instead of genuine mapping, only a minimum search is carried out in respect of the flicker intensity. If during the first search operation no above described aborting of the search occurs up to the first upper limit frequency, searching also continues up to the second upper limit frequency as in the second embodiment. A jump can then be made directly to the frequency stored in the minimum memory. The lamp is then operated for at least 30 min at this frequency and during this time the flicker intensity is determined over this period. If this is increased by more than a permissible factor, e.g. 20%, compared with the original, a new search for the best possible operating frequency is initiated and the method proceeds as described above.

By increasing the operating frequency of the gas discharge lamp burner over its operating time, any tendency of the burner to flicker can be significantly reduced without necessitating cost-intensive measures on the circuit arrangement itself. Due to the fact that the operating electronics of the integrated gas discharge lamp 5 contain a microcontroller, the entire method can be implemented in the microcontroller's software, and does not therefore incur additional costs. Also, with astute design, the flicker detecting circuit arrangement of the second embodiment can be implemented purely in software. Due to the fact that the measured variables necessary for detecting flicker are already present at the microcontroller for other reasons, by suitable evaluation of said variables a detection unit can be implemented in software. The circuit sections that have to be in hardware are already present for other reasons and thus incur no additional costs.

Communications Interface

As already described above, the integrated gas discharge lamps 5 can have means of communication or more specifically at least one communications interface which allows, in particular, communication with the motor vehicle's on-board electronics. A LIN bus appears particularly advantageous, but it is also possible for the integrated gas discharge lamp and the on-board electronics to be linked using a CAN bus.

The communications interface advantageously enables the lamp to communicate with the higher-order control system, e.g. a lighting module in a motor vehicle. Via said communications interface, a variety of information about the integrated gas discharge lamp 5 can be transmitted to the higher-order control system. This information is stored in a nonvolatile memory in the lamp. During production of the integrated gas discharge lamp 5, a variety of information accrues which can be collected by the production system and programmed into the lamp's nonvolatile memory toward the end of production. However, as the information can also be written directly to the nonvolatile memory of the operating electronics of the integrated gas discharge lamp 5, a communications interface is not absolutely necessary for this purpose.

During production, the gas discharge lamp burner 50, for example, is precisely measured and during fitting onto the base 70 is fixed thereon in a precisely defined position with respect to a reference plane of the base. This ensures a high quality of the optical system comprising integrated gas discharge lamp 5 and headlight 3, as the arc burning between the gas discharge lamp electrodes 504 assumes a precise spatial position with respect to the reference plane constituting the interface to the headlight. This means that e.g. the spacing and position of the electrodes are known to the production machine. However, the electrode spacing can constitute an important variable for the operating electronics, as the electrode spacing of the gas discharge lamp burner 50 correlates with the operating voltage. In addition, a unique serial number or alternatively a production batch number can be stored in the nonvolatile memory of the lamp in order to ensure traceability. Via the serial number, the parts used in the integrated gas discharge lamp 5 together with all the available data can be interrogated via a database maintained by the manufacturer so that, in the event of production defects of individual parts, the lamps affected can be identified.

In a preferred embodiment of the integrated gas discharge lamp 5, additional parameters measured during lamp operation and stored in the nonvolatile memory of the integrated gas discharge lamp 5 can be interrogated and also read in via the on-board electronics by means of the communications interface. It may be advisable, for example, to store the data of the optical system comprised by the headlight in the integrated gas discharge lamp 5, as the latter can control the output of the gas discharge lamp burner 50 such that a uniformly high light output of the headlight system is achieved.

In particular the following are possible communications parameters:
 the cumulative operating time of the gas discharge lamp burner 50,
 the number of flicker effects that have occurred, i.e. the number times the permissible limit value has been exceeded,
 the number of starts of the flicker minimum search,
 the current lamp output,
 the current frequency of the inverter,
 the nominal value of the lamp output (=rated power),
 the actual value of the lamp output,
 the temperature of the electronics,
 the serial number or batch number,
 the total number of lamp extinctions and the number of lamp extinctions within a past period e.g. 200 h,
 the number of non-ignitions.

In principle, conventional operating electronics not integrated into the base of the discharge lamp would also have been able to acquire these parameters and provide them via a communications interface. However, these parameters would not be usable for diagnostics as part of motor vehicle servicing, as the lamp could have been changed at any time independently of the operating electronics and the parameters read out consequently need not necessarily describe the currently present system lamp and operating electronics. This disadvantage does not arise in the case of the integrated gas discharge lamp system described, wherein a gas discharge lamp burner and operating electronics for said gas discharge lamp burner are integrated inseparably from one another in a lamp.

The communications interface is preferably a LIN bus or alternatively a CAN bus. Both interface protocols are widely used in the automotive industry. If the integrated gas discharge lamp 5 is not used in a motor vehicle, the communications interface of the integrated gas discharge lamp 5 can also have a protocol such as DALI or EIB/Instabus widely used in the general lighting sector.

On the basis of this data (particularly the cumulative operating time), the higher-order control system present in the motor vehicle can calculate e.g. the likely replacement date of the integrated gas discharge lamp 5. During servicing of the vehicle, a decision can be made as to whether the integrated gas discharge lamp 5 will operate properly until the next service, or whether it must be replaced, as poor light quality or even lamp failure is likely.

Due to the fact that the data can be read out via a communications interface of the integrated gas discharge lamp, a service engineer can read out the data from the integrated gas discharge lamp and if necessary replace the lamp before it fails, as has already been described above in respect of a flickering lamp.

If data from production of the integrated gas discharge lamp is unmodifiably stored in the nonvolatile memory of the operating electronics, in its lifetime calculations the lamp can use this data at any time, thereby making the lifetime calculations, i.e. estimating how long the integrated gas discharge lamp will work properly, much more precise. Preferably stored in the nonvolatile memory of the operating electronics is data from which the production period can be deduced. This enables any production errors or only subsequently discovered defects in a batch to be replaced in the field before the lamp fails. This is of great benefit to the motor vehicle user, as this is a particularly safety-relevant application particularly if the integrated gas discharge lamp is used in a front headlight. If data is stored in the nonvolatile memory of the operating electronics which enables the integrated gas discharge lamp to be uniquely identified, the data stored in a database during production can be easily and reliably assigned to the lamp. This works in a particularly efficient manner if an unambiguous and unique serial number is stored in the nonvolatile memory of the operating electronics. This number includes among other things a manufacturer code agreed among all manufacturers, so that although different manufacturers of the same type of integrated gas discharge lamp can assign a sequential number in their respective production, it is nevertheless ensured that there will be no second lamp possessing the same serial number.

During operation of the integrated gas discharge lamp, one or more numbers are preferably stored in the nonvolatile memory which increase monotonically with the operating time and/or with the number of ignitions of the gas discharge lamp. Said operating time of the gas discharge lamp burner is recorded, summed and stored as the cumulative operating time in the nonvolatile memory of the operating electronics. The cumulative operating time is preferably stored as a number in the nonvolatile memory. However, the operating time can also be weighted by operating parameters and stored as a number in the nonvolatile memory of the operating electronics, said number then corresponding to the cumulative weighted operating time. The different kinds of cumulative operating time will be explained in greater detail below. The previous operating time can therefore be reliably compared with the lifetime specified by the manufacturer, and the lamp's remaining useful life accurately gauged. The lifetime specified by the manufacturer can be a function of other data likewise read out from the nonvolatile memory, so that this can depend, for example, on the number of starts or the required luminous flux of the lamp. The decision as to whether the integrated lamps need to be replaced can also be taken for economic reasons on the basis of the data stored in the service shop's diagnostic equipment which was determined in the course of previous visits, and thus, for example, the information as to how intensively the light was used within the previous service intervals can also be taken into consideration when making the decision.

If a number stored in the nonvolatile memory of the operating electronics is used to gauge lamp flicker, in particular the number of starts of the flicker minimum search or of the current flicker limit, the condition of the integrated gas discharge lamp can be precisely acquired and read out when required. These values can be additionally used during a service of the motor vehicle containing the integrated gas discharge lamp to assess the lamp's remaining useful life. Likewise of interest to the service engineer can be the figure stored in the nonvolatile memory of the operating electronics for the number of ignitions of the gas discharge lamp burner, as the number of ignitions has as much effect on lifetime as the operating time. During a vehicle service, the data is therefore read out of the nonvolatile memory of the operating electronics and a different maintenance approach is taken depending on the data. This makes maintenance more efficient and better, premature failures are rare and customer satisfaction increases. In addition to relying on the engineer's experience, the decision as to whether the integrated gas discharge lamp needs to be replaced can be based on the data read out from the nonvolatile memory of the operating electronics. The decision to change the integrated gas discharge lamp is preferably taken if the cumulative operating time and/or the cumulative weighted operating time and/or the number of ignitions of the gas discharge lamp burner is above a particular limit value. Said limit value preferably depends on the production period and/or on the data permitting unique identification of the integrated gas discharge lamp, thereby making it possible to make a reliable and simple decision about replacing the integrated gas discharge lamp.

Lumen Consistency

However, the information stored in the nonvolatile memory of the integrated gas discharge lamp 5 can also be used to keep the light output of the integrated gas discharge lamp 5 constant over its lifetime. The light output at nominal power of gas discharge lamps changes over their lifetime. With increasing operating time, the efficiency of the lamp decreases due to blackening and denitrification of the discharge vessel, electrode burn-back and the thereby caused change in the discharge arc. This further degrades the efficiency of the optical system as a whole, as these systems are usually dimensioned on the basis of a point light source or more specifically for the shortest discharge arc resulting from the minimum electrode spacing, and if the discharge arc is lengthened, more light is lost in the optical system. Also the optical system itself loses efficiency during its lifetime, whether due to lens clouding or to defocusing caused by temperature cycles or the permanent vibration to which a motor vehicle headlight is subjected. A lamp operating time $t_k$ and a cumulatively weighted operating time $t_{kg}$ will now be discussed, said cumulatively weighted operating time $t_{kg}$ being weighted with a weighting function γ explained below.

As the operating electronics of the integrated gas discharge lamp 5 has stored the relevant parameters of the gas discharge lamps burner 50 in the nonvolatile memory, it can match the operating power $P_{LA}$ present at the gas discharge lamp burner 50 to its cumulative operating time. As the aging process is nonlinear, in a simple embodiment a compensation function β is stored in the operating electronics, as shown in FIG. 27. Here the cumulatively weighted operating time $t_{kg}$ of the lamp is plotted against the quotient of the lamp power $P_{LA}$ divided by the nominal power $P_N$ of the gas discharge lamp burner 50. In the lower range below 10 h operating time, the power is slightly increased. This is designed to help to condition the gas discharge lamp burner 50. This is commonly also referred to as "burning-in" of the gas discharge lamp burner 50 of the integrated gas discharge lamp 5. When the lamp is burned in, it is operated with slightly reduced power (approximately 90% of the nominal power), as the efficiency of the lamp and also of the optical system is still very good. From a cumulatively weighted operating time $t_{kg}$ of approximately 100 h onward, the power gradually increases again until, when the specified end-of-lifetime of 3000 h, is reached, a lamp power $P_{LA}$ is attained which is approximately 10% above the specified nominal lamp burner rating. The light output of the gas discharge lamp burner is therefore essentially constant over its operating time. The function stored in the operating electronics can be influenced by burner parameters stored in the nonvolatile memory at production, such as the electrode spacing, for example.

In the case of an advanced system in which the integrated gas discharge lamp 5 is controlled by a higher-order control system, other lighting functions such as e.g. speed-dependent control of the amount of light emitted can be implemented. In an advanced embodiment of this kind, the operating electronics are designed such that they can operate the gas discharge lamp burner 50 at underpower or overpower. However, if the gas discharge lamp burner 50 is not operated at nominal power, it ages differently compared to operation at nominal power. This has to be taken into consideration in the calculation of the cumulative operating time. For this purpose, a weighting function γ is stored in the operating electronics, which represents a factor dependent on the underpower or overpower. FIG. 28 shows the weighting function γ for an integrated gas discharge lamp 5 designed for use in the front headlight of a motor vehicle. If the gas discharge lamp burner 50 is operated at overpower, it ages faster, since the electrodes become too hot and electrode material evaporates. If the gas discharge lamp burner 50 is operated with significant underpower, it again ages faster, since the electrodes are too cold and consequently electrode material is sputtered off, which is undesirable as it reduces the lifetime of the lamp and reduces the light yield. The operating electronics of the integrated gas discharge lamp 5 therefore have to factor this aging into the cumulatively weighted operating time $t_{kg}$. This can be accomplished e.g. by the following formula:

$$t_{kg}(t) = \int_{0h}^{t} f(\tau) \cdot \gamma\left(\frac{P_{LA}(\tau)}{P_N}\right) d\tau,$$

the function f(τ) merely standing for the operating function, i.e. as soon as the gas discharge lamp burner 50 is operating, f(τ)=1; if the gas discharge lamp burner 50 is not operating, f(τ)=0. Accordingly, if the integrated gas discharge lamp 5 is operated at underpower or overpower, it ages faster by a factor of as much as 10.

In the case of an advanced control system which can operate the gas discharge lamp burner 50 with over- or underpower, advanced communication with the higher-order control unit can also be implemented. This can take the form of the higher-order control unit no longer requesting a particular power from the integrated gas discharge lamp 5, but a predetermined quantity of light. In order to be able to accomplish this, a dimming curve is stored in the operating electronics of the integrated gas discharge lamp 5. FIG. 29 shows such a dimming curve α using the example of an integrated gas discharge lamp 5 for the automotive industry. The dimming curve shows the luminous flux $\phi_{Req}$ emitted by the gas discharge lamp burner 50, or rather, as shown in FIG. 29, the luminous flux $$\frac{\phi_{Req}}{\phi_N}$$

normalized to the nominal luminous flux $\phi_N$, as a function of the burner electrical power $P_{La,s}$, or rather, as shown in FIG. 29, the burner power $$\frac{P_{La,S}}{P_N}$$

normalized to the nominal burner electrical power $P_N$. In FIG. 29 this is plotted for a cumulatively weighted operating time $t_{kg}$ of the gas discharge lamp burner 50 of 100 h. Different curves will be produced for other cumulatively weighted operating times $t_{kg}$ of the gas discharge lamp burner 50. In the ideal case, a three-dimensional characteristics map which also takes the age of the gas discharge lamp burner 50 into account is therefore stored in the operating electronics of the integrated gas discharge lamp 5. FIG. 29 is therefore merely a section through the characteristics map for a cumulatively weighted operating time $t_{kg}$ of the gas discharge lamp burner of 100 h. The characteristics map for determining the lamp power can contain other dimensions in addition to the luminous flux and the cumulatively weighted operating time, such as the operating time since the last ignition of the lamp or the estimated burner temperature, in order to map particularly effects in the range up to a few minutes after ignition which are caused by thermal transients during so-called "run-up" of the lamp during which, among other things, evaporation of the filling occurs. The dimming curve need not necessarily be stored as a characteristics map in the operating electronics of the integrated gas discharge lamp 5, but can also be stored as a function, so that it can be calculated by a microcontroller integrated in the operating electronics. In order to be able to implement as simply as possible the calculation of the lamp power to be set, the underlying function or the corresponding family of characteristics can be approximately expressed by a product, wherein as factors in addition to the nominal power $P_N$ of the gas discharge lamp burner each individual factor describes the effect of one of the above mentioned variables. Thus the required burner power $P_{La}$ for a particular amount of light can be expressed, for example, by the following formula:

$$P_{La} = P_N \cdot \alpha\left(\frac{\phi_{Req}}{\phi_N}\right) \cdot \beta(t_{kg});$$

the factor β takes into account the aging of the gas discharge lamp burner 50. The function β can also include the aging of the optical system, said data being preferably communicated via the communications interface of the integrated gas discharge lamp, so that these effects can likewise be taken into account in the calculation by the operating electronics of the integrated gas discharge lamp. The quantity of light specified by the control unit can be dependent e.g. on the speed of a motor vehicle in which the integrated gas discharge lamp 5 is being operated. When the vehicle is traveling slowly, the lamp is operated in a dimmed manner, whereas when the vehicle is traveling at high speed, e.g. on the freeway, it is operated at somewhat above nominal power in order to ensure long visibility and good lighting of the traffic lane.

In the case of advanced operating electronics of another embodiment of the integrated gas discharge lamp 5, the previous operating time of the gas discharge lamp burner 50 can also or additionally be taken into account during operation. If the cumulatively weighted operating time $t_{kg}$ is approaching the specified end of life of the gas discharge lamp burner, the operating electronics can operate the burner with a power which enables it to age as little as possible and therefore effectively lengthens its useful life compared to conventional operation. FIG. 30 shows a typical burner preserving curve in which the luminous flux quotient $$\frac{\phi_{Req}}{\phi_N}$$

is plotted against the cumulative normalized lifetime $$\frac{t_k}{t_N}.$$

The latter is calculated from the lamp operating time $t_k$ divided by the nominal lifetime $t_N$ of the lamp of e.g. 3,000 hours. Up to 3% of its nominal lifetime, the gas discharge lamp burner 50 is operated at 1.2 times its nominal power in order to condition and burn-in the gas discharge lamp burner 50. The gas discharge lamp burner 50 is then operated for a comparatively long time at nominal power. When the gas discharge lamp burner 50 reaches 80% of its lifetime, the power is progressively reduced to approximately 0.8 times nominal power. When examined more closely, the weighting function in FIG. 28 indicates that the lamp is preserved most when operated at approximately 0.8 times its nominal power. Toward the end of its life, the integrated gas discharge lamp 5 is therefore operated at this power in order to prolong its remaining useful life and prevent sudden lamp failure which, particularly in the automotive sector, can have fatal consequences. Unlike in FIG. 30, instead of the lamp operating time $t_k$, the cumulatively weighted operating time $t_{kg}$ can also be used.

On the basis of the above mentioned data and calculations, the integrated gas discharge lamp 5 can calculate the likely remaining useful life of its gas discharge lamp burner and store it in a nonvolatile memory of the operating electronics 220, 230. If the vehicle is being serviced in the repair shop, the lamp data of interest for the service, in particular the stored remaining useful life, is read out. On the basis of the remaining useful life read out, a decision can then be made as to whether the integrated gas discharge lamp 5 needs to be replaced. It is also conceivable for the serial number of the integrated gas discharge lamp and/or the serial number of the gas discharge lamp burner 50 to be stored in the integrated gas discharge lamp 5. Using the serial number, the repair shop mechanic can interrogate a manufacturer database to ascertain whether the lamp is OK or needs to be changed possibly because of defects in manufacture or rather in the components used in said lamp.

In contrast to the embodiment described above, in another advantageous embodiment of the integrated gas discharge lamp 5 it is not the likely remaining useful life that is read out in the repair shop but the data as to how the lamp has actually been operated. This data is then analyzed by the diagnostic equipment on the basis of the manufacturer database information associated with the respective serial number. For example, the nominal lifetime $t_N$ of a lamp with a given serial number is stored in the manufacturer database. In the event of product defects, this lifetime would be correspondingly short. Because other data concerning operation, such as the number of ignitions, is stored in the operating electronics, these parameters can also be compared with the manufacturer database which then contains, for example, the number of nominal ignitions for each lamp. A high number of ignitions read out from the operating electronics, approaching the nominal ignitions, results in the decision to change the lamp, even though, for example, the nominal lifetime of the lamp has not yet been reached. By using such criteria, the availability of the light source is increased in an economical manner. This approach is particularly to be regarded as economical, since a lamp is not replaced until there is a high probability of its imminent failure. Encoded in the first bit of the serial number of the lamp is the lamp's manufacturer, thereby ensuring that the serial number remains unique, even though a plurality of lamp manufacturers may produce interchangeable products. When nominal data such as nominal lifetime or nominal ignitions is retrieved from the manufacturer database via a communications link between the repair shop and the lamp manufacturer, e.g. via an Internet connection, the operation-related data read out from the operating electronics is communicated in return to the lamp manufacturer. A bidirectional exchange of data therefore takes place between lamp operating electronics and the manufacturer database. This on the one hand allows products to be tracked in the field, in particular a statistical survey of how the product is used, which is greatly advantageous particularly for product development, but also individual data acquisition is possible if, for example, the VIN (Vehicle Identification Number) is transmitted along with the serial number. This also opens up the possibility of protection against counterfeit products. This is achieved in that, in the event of a counterfeit product, the serial number must likewise be copied, which eventually results in an apparent data inconsistency when the data is transmitted to the manufacturer, since, for example, the operating hours which are assigned to a serial number cannot decrease again, which allows a corresponding conclusion to be drawn that counterfeit products are involved.

Arc Straightening

A method for straightening the discharge arc of the gas discharge lamp burner will now be described which is implemented in an embodiment of the integrated gas discharge lamp 5. A first embodiment is based on operating electronics 920 having a topology as shown in FIG. 23. Said operating electronics 920 comprise a DC/DC converter 9210 supplied from a vehicle battery voltage. Connected downstream of the DC/DC converter 9210 via a DC link capacitor $C_{zw}$ is an inverter 9220 which supplies a gas discharge lamp burner 50 with an AC voltage via a lamp circuit. The lamp circuit consists of an output capacitor $C_A$ and the ignition electronics 910, with the primary winding of the ignition transformer in the lamp circuit, and the gas discharge lamp burner 50. By means of this topology, which is widely known from the prior art, straightening of the discharge arc can be achieved with appropriate component configuration.

A straightened discharge arc offers may advantages. A first significant advantage is the improved thermal balance of the gas discharge lamp burner 50, achieved by more uniform thermal loading of the burner vessel wall. This results in better thermal utilization and therefore a longer lifetime of the burner vessel. A second significant advantage is a constricted arc having a reduced diffusivity. With a 'narrower' arc of this kind, e.g. the headlight optics can be more precise and the light yield of the headlight considerably increased. Since in the integrated gas discharge lamp 5 the ignition and operating electronics 910, 920 or rather the combined operating electronics 930 (hereinafter likewise referred to as the operating electronics) are inseparably connected to the gas discharge lamp burner 50, the operating electronics can calibrate to the gas discharge lamp burner 50 in order to achieve a stably burning straight arc. Since because of the inseparability of the operating electronics 920, 930 and gas discharge lamp burner 50 the operating time of the gas discharge lamp burner 50 is also known to the operating electronics 920, 930, aging effects of the gas discharge lamp burner 50 can influence how the gas discharge lamp burner 50 is operated.

The basic procedure for straightening the arc of the integrated gas discharge lamp 5 is as follows: at first switch-on, the operating electronics 920, 930 scan the gas discharge lamp burner 50 for acoustic resonances and detect the frequencies suitable for arc straightening. This is accomplished by scanning through the frequency ranges between a minimum frequency and a maximum frequency. The frequencies are modulated onto the operating frequency of the integrated gas discharge lamp burner. During scanning, the impedance of the gas discharge lamp burner is measured and the lowest impedance is stored with the associated frequency. This frequency with the lowest impedance indicates the maximum achievable arc straightening. Depending on the type of lamp, the minimum frequency can fall to a frequency von 80 kHz, and the maximum frequency can attain a frequency of about 300 kHz. In the case of a typical high pressure discharge lamp for automotive applications, the minimum frequency is approximately 110 kHz and the maximum frequency is approximately 160 kHz. The scanning is necessary to compensate for manufacturing tolerances of the gas discharge lamp burner 50. The typical aging in respect of the resonant frequencies of the lamp is stored e.g. in a table in the microcontroller (not shown) of the operating electronics 920, 930. The values in the table can if necessary be stored as a function of the mode of operation of the gas discharge lamp burner (cycle waveshape, start-up or dimmed mode). In addition, in another embodiment the controlled operation can be extended to include a closed loop controlled modulation mode with a modulation frequency in a narrow band around the calculated frequency (according to the controlled mode). The calculated frequency is modulated with a modulation frequency of e.g. 1 kHz is order to prevent any flicker due to excitation of acoustic resonances in the gas discharge lamp burner 50. An advantage over existing operating devices according to the prior art is that the frequency range (within which the frequency is allowed to vary) is now very small, and the problems in respect of lamps going out or unstable controller response are less serious. Nevertheless, with some lamp types it may be advisable to scan the frequency bands around the actual modulation frequency in respect of their flicker behavior in order to ensure stable lamp operation. For this purpose, in one embodiment the circuit arrangement for detecting flicker is used, and frequencies close to the modulation frequency are scanned for their flicker behavior.

In a first embodiment according to FIG. 23, the frequency of the DC/DC converter 9210 is now selected identical to the modulation frequency. By appropriate dimensioning of the DC link capacitor $C_{zw}$, high frequency ripple remains as a high frequency AC voltage modulated onto the DC voltage produced by the DC/DC converter 9210. The DC voltage with the high frequency AC voltage modulated thereon is used as the input voltage for the inverter 9220. The inverter 9220 is here implemented as a full bridge which converts the DC voltage into a square wave AC voltage. The amplitude of the modulation signal, i.e. of the superimposed high frequency AC voltage, is determined by the dimensioning of the output filter of the full bridge (output capacitor $C_A$) and by the inductance of the secondary winding ($I_{PSH}$, $I_{PSR}$) of the pulse ignition transformer. Due to the fact that in the integrated gas discharge lamp 5 these components are inseparably interconnected, good adjustment of the components to the desired mode of operation is possible. The superimposed high frequency voltage produces the desired straightening of the discharge arc. The disadvantage of this embodiment is the DC/DC converter's fixed frequency mode of operation which does not allow effective soft switching, so that system losses increase.

In a second embodiment according to FIG. 24, the superimposed high frequency voltage is produced by a signal generator 9230. The latter injects the high frequency voltage into the lamp circuit between a choke $L_K$ and the primary winding of the ignition transformer of the ignition electronics 910. Injection upstream of the ignition transformer is important, as the signal generator 9230 would otherwise have to be implemented in a high voltage proof manner. The choke is used to isolate the DC link capacitor $C_{ZK}$, as it would otherwise excessively damp the injected high frequency voltage. For this reason the inductance of the ignition transformer of the ignition electronics 910 should be as small as possible. The signal generator can be designed such that the frequency of the injected high frequency voltage is in turn modulated in order to achieve more reliable and flicker-free operation of the gas discharge lamp burner 50.

In a third embodiment which is shown in FIG. 25, the signal generator is integrated in the ignition electronics 910. Here the gas discharge lamp burner 50 is started by resonant ignition. The ignition electronics have an ignition transformer $T_{IR}$ designed for high frequency operation which is controlled by a signal generator implemented as a class E converter. The ignition transformer $T_{IR}$ must be dimensioned such that it can still sufficiently well transfer at least the fundamental of the high frequency occurring and which is identical to the switching frequency of the class E converter, in particular such that its efficiency is better than 10% at this frequency. The switching frequency of the class E converter during ignition has a value of between 80 kHz and 10 MHz. However, the frequency is frequently selected above 300 kHz, as a compact design is possible here, and below 4 MHz, as here the achievable efficiencies are particularly high. The ignition transformer is controlled via an electrically isolated primary winding. The secondary winding is split into two electrically isolated windings which are each connected between a lamp electrode and the inverter 9220. The signal generator here produces a high frequency current through the primary winding of the ignition transformer $T_{IR}$ which excites a resonance in a resonant circuit on the secondary side which enables the gas discharge lamp burner 50 to break down. Said resonant circuit comprises the secondary inductance of the ignition transformer $T_{IR}$ and a capacitance $C_{R2}$ across the lamp. As the capacitance $C_{R2}$ is very small, it does not need to be integrated as a component in the ignition electronics 910, but can be produced by design measures.

As soon as the gas discharge lamp burner 50 has ignited, the mode of operation of the signal generator is changed so that it now injects a high frequency signal via the ignition transformer $T_{IR}$ which is modulated onto the lamp voltage for arc straightening. The advantage of this is that the frequency and amplitude of the superimposed voltage is relatively freely adjustable without having to dispense with an optimized mode of operation of the DC/DC converter 9210 or of the inverter 9220. This circuit topology enables the ignition electronics 910 also to provide an increased transfer voltage for the gas discharge lamp burner 50 which is generated via the resonant circuit, so that said voltage does not have to be generated by the DC/DC converter 9210. This measure enables the mode of operation of the DC/DC converter 9210 to be further optimized, as the necessary output voltage range of the DC/DC converter 9210 becomes smaller. The inverter 9220 also has to convert less power, as part of the lamp power is injected via the superimposed lamp voltage. This embodiment therefore offers the greatest freedom for implementing the operating parameters, thereby providing optimized and reliable operation of the gas discharge lamp burner 50 with straightened discharge arc.

FIG. 26 shows a simplified embodiment of a DC/DC converter 9210 as compared to the prior art. The DC/DC converters normally used in the prior art for lamp ballasts which can be operated on an on-board electric system have a flyback converter topology, as the on-board electrical system's 12 V supply must be stepped up to a higher voltage. Due to the fact that, in the integrated gas discharge lamp 5, the electrical contacting does not take place until the lamp is inserted in the headlight 3, a simplified converter in the form of a boost converter with an autotransformer $T_{FB}$ can be used. This is possible, as with the electromechanical interface used, accidental contacting of the converter output with vehicle ground, which could result in destruction of the boost converter, can be eliminated. The flyback DC/DC converters used hitherto in the prior art allow the power to be interrupted despite an output-side short circuit. This is not the case in the present converter concept according to FIG. 26, as here no electrical isolation is present in the converter's power path which could interrupt the power flow from the input, i.e. the 12 V vehicle supply, to the output, i.e. to the power supply lead of the gas discharge lamp burner 50 which was accidentally connected to vehicle ground. The DC/DC converter is otherwise of conventional design. It consists of an input-side EMI filter, an input capacitor C1, a converter switch Q, an inductance $T_{FB}$ implemented as an autotransformer which acts on the DC link capacitor $C_{ZW}$ via a diode D. This converter is much less expensive than the flyback converters used in the prior art, which means that the integrated gas discharge lamp 5 is much less expensive in system terms than a lamp system according to the prior art, comprising a gas discharge lamp and an external electronic operating device.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. An integrated gas discharge lamp with ignition electronics integrated into the base, comprising an ignition transformer, an ignition capacitor, and a controlled switching element, wherein the integrated ignition electronics are configured to generate an asymmetrical ignition pulse, and wherein the voltage ratio between the first lamp electrode near the base and the second lamp electrode distant from the base ranges from 22:1 to 5:4.

2. The integrated gas discharge lamp as claimed in claim 1, wherein the duration of the first half cycle of the asymmetrical ignition pulse ranges between 10 ns and 100 µs, in particular between 40 ns and 1 µs.

3. The integrated gas discharge lamp as claimed in claim 1, wherein the voltage that can be generated by the asymmetrical ignition pulse at the first lamp electrode near the base is 4-25 kV, and the voltage that can be generated by the asymmetrical ignition pulse at the second lamp electrode distant from the base is 0.5-8 kV.

4. The integrated gas discharge lamp as claimed in claim 1, wherein the ignition transformer has a split secondary winding, a first section (S1) being assigned to the first lamp electrode, a second section (S2) being assigned to the second lamp electrode, and the turns ratio of the first to the second section nS1:nS2 being expressed by the following equation:

$$n_{S2} = 0.04 \ldots 0.8 * n_{S1}.$$

5. The integrated gas discharge lamp as claimed in claim 4, wherein the ignition transformer has 1-4 primary turns and 40-380 secondary turns.

6. The integrated gas discharge lamp as claimed in claim 1, wherein the ignition electronics has a threshold switch whose switching voltage is between 350 and 1300 V.

7. The integrated gas discharge lamp as claimed in claim 1, wherein the ignition electronics have two inductors which are each connected between a lamp electrode and a high voltage side secondary terminal of the ignition transformer.

8. The integrated gas discharge lamp as claimed in claim 1, wherein the ignition electronics have a burner capacitor ($C_B$) which is connected between the two lamp electrodes, said burner capacitor having a capacitance of less than 22 pF.

9. The integrated gas discharge lamp as claimed in claim 1, wherein the ignition electronics have a return capacitor which is connected between the low voltage side secondary terminals of the ignition transformer and has a capacitance of 68 pF to 22 nF.

10. The integrated gas discharge lamp as claimed in claim 1, wherein the ignition electronics have a return conductor choke which together with the return capacitor forms a low pass filter.

11. The integrated gas discharge lamp as claimed in claim 1, wherein the ignition electronics have a current-compensated choke connected to the input of the ignition electronics.

12. The integrated gas discharge lamp as claimed in claim 1, wherein the ignition electronics have a TVS diode connected between the input terminals of the ignition electronics.

13. The integrated gas discharge lamp as claimed in claim 1, wherein the gas discharge lamp has a base which, when inserted into a reflector, simultaneously accomplishes mechanical fixing and at the same time establishes electrical contact.

14. The integrated gas discharge lamp as claimed in claim 1, wherein the ignition electronics have a burner capacitor which is connected between the two lamp electrodes, said burner capacitor having a capacitance of between 3 and 15 pF.

* * * * *